United States Patent
Ando et al.

(10) Patent No.: US 7,050,433 B2
(45) Date of Patent: May 23, 2006

(54) ADDRESS MANAGEMENT APPARATUS AND ADDRESS MANAGEMENT METHOD

(75) Inventors: Satoshi Ando, Fukuoka (JP); Yuji Shimizu, Fukuoka (JP); Kazuhide Sawabe, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1150 days.

(21) Appl. No.: 09/754,142

(22) Filed: Jan. 5, 2001

(65) Prior Publication Data

US 2001/0007567 A1 Jul. 12, 2001

(30) Foreign Application Priority Data

Jan. 7, 2000 (JP) ...................... 2000-001785

(51) Int. Cl.
*H04L 12/28* (2006.01)

(52) U.S. Cl. ...................... 370/392; 370/401
(58) Field of Classification Search ................ 370/389, 370/392, 401, 402, 403, 404, 405, 406
See application file for complete search history.

(56) References Cited

U.S. PATENT DOCUMENTS

| | | | | |
|---|---|---|---|---|
| 5,452,292 A | * | 9/1995 | Okanoue et al. | ............ 370/403 |
| 5,835,725 A | | 11/1998 | Chiang et al. | |
| 6,445,690 B1 | * | 9/2002 | Sato et al. | .................. 370/338 |
| 6,493,340 B1 | * | 12/2002 | Kawanaka | .................. 370/392 |
| 6,542,506 B1 | * | 4/2003 | Lee | ........................ 370/395.31 |
| 6,611,892 B1 | * | 8/2003 | Sasaki et al. | ............... 710/306 |

OTHER PUBLICATIONS

"Dynamic Host Configuration Protocol", R. Droms, Bucknell University, Mar. 1997.
W. Richard Stevens, "TCP/IP Illustrated, vol. 1: the protocols", 1994, Addison Wesley, Reading, MA, US, XP002247360.

* cited by examiner

*Primary Examiner*—Chau Nguyen
*Assistant Examiner*—Andrew Wahba
(74) *Attorney, Agent, or Firm*—Wenderoth, Lind & Ponack, L.L.P.

(57) ABSTRACT

An address management apparatus includes a storage unit for storing a table showing the correspondence between data link layer and network layer addresses, a first search unit for searching the table for an unused data link layer address, a second search unit for searching the table for a network layer address corresponding to a specified data link layer address, and an instruction unit for transmitting an instruction including the unused data link layer address to a terminal specified by the detected network layer address. The apparatus also includes an updation unit for updating the correspondence between the data link layer and the network layer addresses on the table according to the instruction, a detection unit for detecting the instruction to obtain the data link layer address, and a setting unit for setting the data link layer address obtained by the detection unit in the self terminal.

15 Claims, 21 Drawing Sheets

Fig.11

(a1) address state of server

| network layer address | data link layer address |
|---|---|
| NA1 | DA1 |

(a2) address state of server

| network layer address | data link layer address |
|---|---|
| NA1 | DA1 |

(b1) address state of client 1

| network layer address | data link layer address |
|---|---|
| NA2 | DA2 |

(b2) address state of client 1

| network layer address | data link layer address |
|---|---|
| NA2 | DA3 |

(d1) data link layer address table

| data link layer address | network layer address |
|---|---|
| DA1 | NA1 |
| DA2 | NA2 |
| DA3 | NULL |
| DA4 | NULL |

(d2) data link layer address table

| data link layer address | network layer address |
|---|---|
| DA1 | NA1 |
| DA2 | NULL |
| DA3 | NA2 |
| DA4 | NULL |

Fig.16

(a1) address state of server

| network layer address | data link layer address |
|---|---|
| NA1 | DA1 |

(b1) address state of client 1

| network layer address | data link layer address |
|---|---|
| NA2 | DA2 |

(c1) address state of client 2

| network layer address | data link layer address |
|---|---|
| NULL | DA2 |

(d1) data link layer address table

| data link layer address | network layer address |
|---|---|
| DA1 | NA1 |
| DA2 | NA2 |
| DA3 | NULL |
| DA4 | NULL |

(e1) network layer address table

| network layer address | data link layer address |
|---|---|
| NA1 | DA1 |
| NA2 | DA2 |
| NA3 | NULL |
| NA4 | NULL |

(a2) address state of server

| network layer address | data link layer address |
|---|---|
| NA1 | DA1 |

(b2) address state of client 1

| network layer address | data link layer address |
|---|---|
| NA2 | DA3 |

(c2) address state of client 2

| network layer address | data link layer address |
|---|---|
| NULL | DA2 |

(d2) data link layer address table

| data link layer address | network layer address |
|---|---|
| DA1 | NA1 |
| DA2 | NULL |
| DA3 | NA2 |
| DA4 | NULL |

(e2) network layer address table

| network layer address | data link layer address |
|---|---|
| NA1 | DA1 |
| NA2 | DA3 |
| NA3 | NULL |
| NA4 | NULL |

(a3) address state of server

| network layer address | data link layer address |
|---|---|
| NA1 | DA1 |

(b3) address state of client 1

| network layer address | data link layer address |
|---|---|
| NA2 | DA3 |

(c3) address state of client 2

| network layer address | data link layer address |
|---|---|
| NA3 | DA2 |

(d3) data link layer address table

| data link layer address | network layer address |
|---|---|
| DA1 | NA1 |
| DA2 | NA3 |
| DA3 | NA2 |
| DA4 | NULL |

(e3) network layer address table

| network layer address | data link layer address |
|---|---|
| NA1 | DA1 |
| NA2 | DA3 |
| NA3 | DA2 |
| NA4 | NULL |

Fig.18

(a1) address state of server

| network layer address | data link layer address |
|---|---|
| NA1 | DA1 |

(a2) address state of server

| network layer address | data link layer address |
|---|---|
| NA1 | DA1 |

(a3) address state of server

| network layer address | data link layer address |
|---|---|
| NA1 | DA1 |

(a4) address state of server

| network layer address | data link layer address |
|---|---|
| NA1 | DA1 |

(b1) address state of client 1

| network layer address | data link layer address |
|---|---|
| NULL | DA2 |

(b2) address state of client 1

| network layer address | data link layer address |
|---|---|
| NA2 | DA2 |

(b3) address state of client 1

| network layer address | data link layer address |
|---|---|
| NA2 | DA3 |

(b4) address state of client 1

| network layer address | data link layer address |
|---|---|
| NA2 | DA3 |

(c1) address state of client 2

| network layer address | data link layer address |
|---|---|
| NULL | DA2 |

(c2) address state of client 2

| network layer address | data link layer address |
|---|---|
| NULL | DA2 |

(c3) address state of client 2

| network layer address | data link layer address |
|---|---|
| NULL | DA2 |

(c4) address state of client 2

| network layer address | data link layer address |
|---|---|
| NA3 | DA2 |

(d1) data link layer address table

| data link layer address | network layer address |
|---|---|
| DA1 | NA1 |
| DA2 | NULL |
| DA3 | NULL |
| DA4 | NULL |

(d2) data link layer address table

| data link layer address | network layer address |
|---|---|
| DA1 | NA1 |
| DA2 | NA2 |
| DA3 | NULL |
| DA4 | NULL |

(d3) data link layer address table

| data link layer address | network layer address |
|---|---|
| DA1 | NA1 |
| DA2 | NULL |
| DA3 | NA2 |
| DA4 | NULL |

(d4) data link layer address table

| data link layer address | network layer address |
|---|---|
| DA1 | NA1 |
| DA2 | NA3 |
| DA3 | NA2 |
| DA4 | NULL |

(e1) network layer address table

| network layer address | data link layer address |
|---|---|
| NA1 | DA1 |
| NA2 | NULL |
| NA3 | NULL |
| NA4 | NULL |

(e2) network layer address table

| network layer address | data link layer address |
|---|---|
| NA1 | DA1 |
| NA2 | DA2 |
| NA3 | NULL |
| NA4 | NULL |

(e3) network layer address table

| network layer address | data link layer address |
|---|---|
| NA1 | DA1 |
| NA2 | DA3 |
| NA3 | NULL |
| NA4 | NULL |

(e4) network layer address table

| network layer address | data link layer address |
|---|---|
| NA1 | DA1 |
| NA2 | DA3 |
| NA3 | DA2 |
| NA4 | NULL |

Fig.20

(a1) address state of server

| network layer address | data link layer address |
|---|---|
| NA1 | DA1 |

(b1) address state of client 1

| network layer address | data link layer address |
|---|---|
| NA3 | DA3 |

(c1) address state of client 2

| network layer address | data link layer address |
|---|---|
| NA2 | DA3 |

(d1) data link layer address table

| data link layer address | network layer address |
|---|---|
| DA1 | NA1 |
| DA2 | NA2 |
| DA3 | NULL |
| DA4 | NULL |

(e1) network layer address table

| network layer address | data link layer address |
|---|---|
| NA1 | DA1 |
| NA2 | DA2 |
| NA3 | NULL |
| NA4 | NULL |

(a2) address state of server

| network layer address | data link layer address |
|---|---|
| NA1 | DA1 |

(b2) address state of client 1

| network layer address | data link layer address |
|---|---|
| NA3 | DA3 |

(c2) address state of client 2

| network layer address | data link layer address |
|---|---|
| NA2 | DA3 |

(d2) data link layer address table

| data link layer address | network layer address |
|---|---|
| DA1 | NA1 |
| DA2 | NA2 |
| DA3 | NA3 |
| DA4 | NULL |

(e2) network layer address table

| network layer address | data link layer address |
|---|---|
| NA1 | DA1 |
| NA2 | DA2 |
| NA3 | DA3 |
| NA4 | NULL |

(a3) address state of server

| network layer address | data link layer address |
|---|---|
| NA1 | DA1 |

(b3) address state of client 1

| network layer address | data link layer address |
|---|---|
| NA3 | DA3 |

(c3) address state of client 2

| network layer address | data link layer address |
|---|---|
| NA2 | DA3 |

(d3) data link layer address table

| data link layer address | network layer address |
|---|---|
| DA1 | NA1 |
| DA2 | NULL |
| DA3 | NA2 |
| DA4 | NULL |

(e3) network layer address table

| network layer address | data link layer address |
|---|---|
| NA1 | DA1 |
| NA2 | DA3 |
| NA3 | NULL |
| NA4 | NULL |

ADDRESS MANAGEMENT APPARATUS AND ADDRESS MANAGEMENT METHOD

FIELD OF THE INVENTION

The present invention relates to an apparatus and a method for managing addresses of network devices requiring unique addresses for communication.

BACKGROUND OF THE INVENTION

In the OSI (Open System Interconnection) standardization which is currently being promoted by the ISO (International Organization for Standardization), an OSI reference model is defined in which networks are hierarchically organized to verify the interconnectivity between the networks.

The internet, which has become widespread in recent years, is constructed by using the TCP/IP protocol, and this protocol corresponds to a network layer and a transport layer of the OSI reference model. Further, there is the IEEE 802.3 as one of the lower layers of the TCP/IP. This IEEE 802.3 corresponds to a data link layer of the OSI reference model.

In the network layer of the OSI reference model, in order to uniquely identify network devices in a network where a plurality of LANs are interconnected, a network layer address should be assigned to each network device. If the same network layer address is set on different network devices, communication at the network layers cannot be performed normally.

The network layer addresses may be managed by a network administrator, or the network layer address may be managed automatically. To be specific, in the former method, a network administrator manages a plurality of available network layer addresses and how the addresses are used, and performs address assignment when a network is established. In the latter method, a plurality of available network layer addresses are automatically assigned by using the DHCP (Dynamic Host Configuration Protocol, RFC2131), which is a kind of TCP/IP protocol.

On the other hand, also in the data link layer, in order to uniquely identify network devices in a LAN to which the network devices are connected, a data link layer address must be assigned to each network device. If the same data link layer address is set on different network devices in the same LAN, communication at the data link layers cannot be performed normally.

The data link layer addresses are managed as follows. A rule is determined among the manufacturers of network devices so that the same data link layer address is not assigned to different network devices, and the manufacturers assign data link layer addresses to the respective network devices according to this rule.

However, since a data link layer address set on a network device can be changed by the user, there is a possibility that the user may set a data link layer address which is already set on another network device. Further, since there is a limit to the number of data link layer addresses, when the number of network devices increases considerably, it is impossible to assign different data link layer addresses to the respective network devices. Further, since the communication by the network layer protocol depends on the data link layer protocol which is the lower-layer protocol, it is difficult to change the data link layer address by using the network layer protocol.

For the reasons described above, the address administrator must conventionally perform the work of changing the data link layer address directly to the target network device. There have been proposed two methods of setting data link layer addresses and network layer addresses, as follows. The first method is to set a data link layer address and a network layer address under the state where the network function is unavailable, and the second method is to assign a single network layer address to a specific data link layer address. Hereinafter, these methods will be briefly described with reference to the drawings.

Initially, the above-mentioned first method (first prior art), i.e., the method of setting a data link layer address under the network function unavailable state, will be described with reference to FIG. 5.

FIG. 5 is a block diagram illustrating an example of the construction of the first prior art. In FIG. 5, B500 denotes an apparatus for setting data link layer addresses, B501 denotes a data link layer address inputting means for inputting a data link layer address from a network administrator, and B502 denotes a data link layer address setting means for setting a designated data link layer address on a network device. A data link layer address inputted to the data link layer address inputting means B501 is supplied to the data link layer address setting means B502, and the data link layer address setting means B502 changes the data link layer address of the network device to the inputted data link layer address.

Next, the above-described second method (second prior art), i.e., the method of assigning a single network layer address to a specific data link layer address, will be described with reference to FIG. 6. In other words, this second method is to set a network layer address on a network device so that the same address is not set on another network terminal.

FIG. 6 is a block diagram illustrating an example of the construction of the second prior art.

In FIG. 6, B600 denotes an address management apparatus for managing network layer addresses; B601 denotes a network layer address storage means for storing the correspondence between network layer addresses and data link layer addresses in a network layer address table; B602 denotes a network layer address search means for searching the network layer address table for an unused network layer address which is not associated with a data link layer address; B603 denotes a network layer address updation means for updating the correspondence between a data link layer address and a designated network layer address; B604 denotes a network layer address assignment instruction means for transmitting a network layer address assignment instruction which instructs an assignment of a network layer address; B605 denotes a network layer address assignment instruction detection means for detecting a network layer address assignment instruction which instructs an assignment of a network layer address; B606 denotes a network layer address setting means for setting the inputted network layer address on a network device; B607 denotes a network layer address assignment request means for transmitting a network layer address assignment request which requests for an assignment of a network layer address; B608 denotes a network layer address assignment request detection means for detecting a network layer address assignment request; and B609 denotes a corresponding data link layer address search means for searching the network layer address table for a network layer address corresponding to a designated data link layer address.

FIG. 15(A) shows the construction of a network layer address assignment request D1500.

The network layer address assignment request D1500 is composed of a destination data link layer address field D1001 as an area where a destination data link layer address is stored, and a source data link layer address field D1002 as an area where a source data link layer address is stored.

FIG. 15(B) shows the construction of a network layer address table D1503.

The network layer address table D1503 contains a plurality of network layer address correspondence lists D1504, and each list D1504 is composed of a data link layer address field D1505 where a data link layer address is stored, and a network layer address field D1506 where a network layer address corresponding to the data link layer address is stored.

FIG. 15(C) shows the construction of a network layer address assignment instruction D1507.

The network layer address assignment instruction D1507 is composed of a destination data link layer address field D1001 where a destination data link layer address is stored, a source data link layer address field D1002 where a source data link layer address is stored, a destination network layer address field D1003 where a destination network layer address is stored, a source network layer address field D1104 where a source network layer address is stored, and an assignment network layer address field D1508 where a network layer address to be assigned is stored.

FIG. 21 is a flowchart for explaining the operation of the whole address management apparatus according to the second prior art.

The network layer address assignment request means B607 sets the data link layer address of the self network device in the source data link layer address field D1002 of the network layer address assignment request D1500, sets a data link layer broadcast address, in the destination data link layer address field D1001, indicating all of other network devices to be connected to a LAN to which the self network device is connected, and then transmits the network layer address assignment request D1500 (S2100).

The network layer address assignment request detection means B608 performs detection of a network layer address assignment request (S2101). When any of the network devices in the LAN, each having a network layer address assignment request detection means, detects the network layer address assignment request D1500, the detecting network device extracts the data link layer address from the source data link layer address field D1002 in the network layer address assignment request D1500, and sets the data link layer address in the destination data link layer address field D1001 in the network layer address assignment instruction D1507 (S2102).

When the corresponding data link layer address search means B609 detects, from the network layer address table D1503, a network layer address corresponding to the source data link layer address in the network layer address assignment request D1500 (S2103, S2104), the corresponding data link layer address search means B609 sets this address in the assignment network layer address field D1508 (S2110).

The network layer address search means B602 searches the network layer address table for an unused network layer address (S2105). When there is no unused network layer address, the network layer address search means B602 ends the process. When an unused network layer address is detected (S2106), the network layer address assignment instruction means B604 sets the unused network layer address in the assignment network layer address field D1508 in the network layer address assignment instruction D1507 (S2107).

Then, the network layer address assignment instruction means B604 sets the data link address in the source data link layer address field D1002 in the network layer address assignment instruction D1507, sets the network address in the source network address field D1004 in the network layer address assignment instruction D1507, and transmits the network layer address assignment instruction D1507.

The network layer address assignment instruction detection means B605 detects the network layer address assignment instruction D1507, and the network layer address setting means B606 extracts the assignment network layer address field D1508 from the network layer address assignment instruction D1507 and sets the network layer address in the field D1508 (S2108). The network layer address updation means B603 enters the correspondence between the data link layer address to which the network layer address assignment instruction is directed and the network layer address which has instructed assignment into the network layer address table D1503 in the network layer address storage means B601 (B2109).

In the above-described first prior art, however, since there is no means for obtaining the data from the network, it is impossible to set the data link layer address through the network. That is, in this first prior art method, the network must be temporarily halted to set the data link layer address.

Furthermore, according to the second prior art, since the data link layer address is used to decide the destination of the network layer address assignment instruction, even if the same data link layer address is set on plural network devices, it is impossible to distinguish these devices from each other on which the same data link layer address is set. That is, there is the possibility that the same network layer address might be set on plural network devices.

SUMMARY OF THE INVENTION

The present invention is made to solve the above-described problems. Accordingly, an object of the present invention is to provide an address management apparatus and an address management method which can set a data link layer address through a network, and which can set a network layer address even when the same data link layer address is set on plural network devices.

Other objects and advantages of the invention will become apparent from the detailed description that follows. The detailed description and specific embodiments described herein are provided only for illustration since various additions and modifications within the scope of the present invention will be apparent to those of skill in the art from the detailed description.

According to a first aspect of the present invention, there is provided an address management apparatus for managing a network layer address and a data link layer address of a terminal connected to a network. The address management apparatus of the first aspect comprises: data link layer address storage means for storing a data link layer address table showing the correspondence between data link layer addresses and network layer addresses; data link layer address search means for searching the data link layer address table so as to detect an unused data link layer address; corresponding network layer address search means for searching the data link layer address table so as to detect a network layer address corresponding to a specified data link layer address; data link layer address assignment instruction means for transmitting a data link layer address assignment instruction which includes, as information, at least the unused data link layer address detected by the data link layer address search means, to a terminal specified by the network layer address detected by the corresponding network layer address search means; data link layer address updation means for updating the correspondence between the data link layer address and the network layer address on the data link layer address table according to the information of the data link layer address assignment instruction; data link layer address assignment instruction detection means for detecting the data link layer address assignment instruction so as to obtain the data link layer address from the instruction, in the terminal specified by the network layer address detected by the corresponding network layer address search means; and data link layer address setting means for setting the data link layer address obtained by the data link layer address assignment instruction detection means, in the self terminal. Therefore, the data link layer address can be changed through the network while maintaining the one-to-one correspondence between the data link layer address and the network layer address.

According to a second aspect of the present invention, the address management apparatus of the first aspect further comprises: network layer address storage means for storing a network layer address table showing the correspondence between network layer addresses and data link layer addresses; network layer address search means for searching the network layer address table so as to detect an unused network layer address; corresponding data link layer address search means for searching the network layer address table so as to detect a network layer address corresponding to a specified data link layer address; network layer address assignment request detection means for detecting a network layer address assignment request including at least data link layer address information, which network layer address assignment request is output from a terminal that needs to set a network layer address; address assignment instruction means for transmitting a network layer address assignment instruction including, as information, the unused network layer address detected by the network layer address search means, to the terminal which needs to set a network layer address, when there is no network layer address detected by the corresponding data link layer address search means; and network layer address updation means for updating the correspondence between the network layer address and the data link layer address on the network layer address table according to the network layer address assignment instruction or the data link layer address assignment instruction. The data link layer address updation means updates the correspondence between the data link layer address and the network layer address on the data link layer address table according to the network layer address assignment instruction or the data link layer address assignment instruction. The address management apparatus also comprises network layer address assignment request means for transmitting the network layer address assignment request in the terminal which needs to set a network layer address; network layer address assignment instruction detection means for detecting the network layer address assignment instruction, and extracting the network layer address from the instruction; and network layer address setting means for setting the network layer address extract ed by the network layer address assignment instruction detection means, in the self terminal. The corresponding network layer address search means searches the data link layer address table for a network layer address corresponding to the data link layer address in the network layer address assignment request information. When the network layer address searched by the corresponding network layer address search means exists in the data link layer address table, the data link layer address assignment instruction means transmits a data link layer address assignment instruction including, as information, at least the unused data link layer address detected by the data link layer address search means to the terminal having the network layer address. This address management apparatus according to the second aspect allows for an automatic assignment of an unused data link layer address to a client which is associated with a network layer address and is given a data link layer address that is also set on another client. Further, this address management apparatus according to the second aspect also allows for an automatic assignment of a new network layer address to a client which sends a request for an assignment of a network layer address and is given a data link layer address that is also set on another client.

According to a third aspect of the present invention, the address management apparatus of the second aspect further comprises network layer address assignment request delay means for detecting, in the self terminal, a network layer address assignment request directed to another terminal, extracting a source data link layer address in the information of the detected network layer address assignment request, and delaying transmission of a network layer address assignment request from the self terminal when the extracted data link layer address is equal to the data link layer address of the self terminal. Therefore, even when the same data link layer address is set on plural terminals, this address management apparatus according to the third aspect allows for an assignment of a network layer address to each terminal.

According to a fourth aspect of the present invention, the address management apparatus of the first or second aspect further comprises address detection means for detecting the correspondence between a data link layer address and a network layer address of a source of a transmission packet on the connected network, and the correspondence between a data link layer address and a network layer address of a destination of the transmission packet. In this address management apparatus according to the fourth aspect, the data link layer address updation means updates the correspondence between the data link layer address and the network layer address on the data link layer address table according to the correspondence between the data link layer address and the network layer address of the source and the correspondence between the data link layer address and the network layer address of the destination, which are detected by the address detection means, and the network layer address table updation means updates the correspondence between the data link layer address and the network layer address on the network layer address table according to the correspondence between the data link layer address and the network layer address of the source and the correspondence between the data link layer address and the network layer address of the destination, which are detected by the address detection means. Therefore, even when an address is set or changed outside the address management apparatus of this invention, this address management apparatus allows for an assignment of a network layer address without assigning the same data link layer address or network layer address on plural terminals.

According to a fifth aspect of the present invention, there is provided an address management method for managing a network layer address and a data link layer address of a terminal connected to a network. The method of the fifth aspect comprises: a data link layer address storage step of storing a data link layer address table showing the correspondence between data link layer addresses and network layer addresses; a data link layer address search step of searching the data link layer address table so as to detect an unused data link layer address; a corresponding network layer address search step of searching the data link layer address table so as to detect a network layer address corresponding to a specified data link layer address; a data link layer address assignment instruction step of transmitting a data link layer address assignment instruction which includes, as information, at least the unused data link layer address detected in the data link layer address search step, to a terminal specified by the network layer address detected in the corresponding network layer address search step; a data link layer address updation step of updating the correspondence between the data link layer address and the network layer address on the data link layer address table according to the information of the data link layer address assignment instruction; a data link layer address assignment instruction detection step of detecting the data link layer address assignment instruction so as to obtain the data link layer address from the instruction, in the terminal specified by the network layer address detected in the corresponding network layer address search step; and a data link layer address setting step of setting the data link layer address obtained in the data link layer address assignment instruction detection step, in the self terminal. Therefore, the data link layer address can be changed through the network while maintaining the one-to-one correspondence between the data link layer address and the network layer address.

According to a sixth aspect of the present invention, the address management method of the fifth aspect further comprises: a network layer address storage step of storing a network layer address table showing the correspondence between network layer addresses and data link layer addresses; a network layer address search step of searching the network layer address table so as to detect an unused network layer address; a corresponding data link layer address search step of searching the network layer address table so as to detect a network layer address corresponding to a specified data link layer address; a network layer address assignment request detection step of detecting a network layer address assignment request including at least data link layer address information, which network layer address assignment request is transmitted by a terminal that needs to set a network layer address; an address assignment instruction step of transmitting a network layer address assignment instruction including, as information, the unused network layer address detected in the network layer address search step, to the terminal which needs to set a network layer address, when no network layer address is detected in the corresponding data link layer address search step; and a network layer address updation step of updating the correspondence between the network layer address and the data link layer address on the network layer address table, according to the network layer address assignment instruction or the data link layer address assignment instruction. The data link layer address updation step updates the correspondence between the data link layer address and the network layer address on the data link layer address table according to the network layer address assignment instruction or the data link layer address assignment instruction. The method of the sixth aspect also comprises a network layer address assignment request step of transmitting the network layer address assignment request in the terminal which needs to set a network layer address; a network layer address assignment instruction detection step of detecting the network layer address assignment instruction, and extracting the network layer address from the instruction; and network layer address setting step of setting the network layer address extracted in the network layer address assignment instruction detection step, in the self terminal. In the corresponding network layer address search step, the data link layer address table is searched for a network layer address corresponding to the data link layer address in the network layer address assignment request information. When the network layer address searched in the corresponding network layer address search step exists in the data link layer address table, in the data link layer address assignment instruction step, a data link layer address assignment instruction including, as information, at least the unused data link layer detected in the data link layer address search step, is transmitted to the terminal having the network layer address. This address management method according to the sixth aspect also allows for an automatic assignment of an unused data link layer address to a client which is associated with a network layer address and is given a data link layer address that is also set on another client. Further, this address assignment method according to the sixth aspect allows for an automatic assignment of a new network layer address to a client which sends a request for assignment of a network layer address and is given a data link layer address that is also set on another client.

According to a seventh aspect of the present invention, the address management method of the sixth aspect further comprises a network layer address assignment request delay step of detecting, in the self terminal, a network layer address assignment request directed to another terminal, extracting a source data link layer address in the information of the detected network layer address assignment request, and delaying transmission of a network layer address assignment request from the self terminal when the extracted data link layer address is equal to the data link layer address of the self terminal. Therefore, even when the same data link layer address is set on plural terminals, this address management method according to the seventh aspect allows for an assignment of a network layer address to each terminal.

According to an eighth aspect of the present invention, the address management method of the fifth or sixth aspect further comprises an address detection step of detecting the correspondence between a data link layer address and a network layer address of a source of a transmission packet on the connected network, and the correspondence between a data link layer address and a network layer address of a destination of the transmission packet. In the data link layer address updation step, the correspondence between the data link layer address and the network layer address on the data link layer address table is updated according to the correspondence between the data link layer address and the network layer address of the source, and the correspondence between the data link layer address and the network layer address of the destination, which are detected in the address detection step. In the network layer address table updation step, the correspondence between the data link layer address and the network layer address on the network layer address table is updated according to the correspondence between the data link layer address and the network layer address of the source, and the correspondence between the data link layer address and the network layer address of the destination, which are detected in the address detection step. Therefore, even when an address is set or changed outside an address management apparatus of this invention, this address management method allows for an assignment of a network layer address without assigning the same data link layer address or network layer address on plural terminals.

BRIEF DESCRIPTION OF THE DRAWINGS

FIG. 11 is a diagram illustrating (a) the address state of the server, (b) the address state of the client 1, and (c) the state of the data link layer address table, before and after the process according to the first embodiment.

FIG. 16 is a diagram illustrating (a) the address state of the server, (b) the address state of the client 1, (c) the address state of the client 2, (d) the state of the data link layer address table, and (e) the state of the network layer address table, before, during, and after the process according to the second embodiment.

FIG. 18 is a diagram illustrating (a) the address state of the server, (b) the address state of the client 1, (c) the address state of the client 2, (d) the state of the data link layer address table, and (e) the state of the network layer address table, before, during, and after the process according to the third embodiment.

FIG. 20 is a diagram illustrating (a) the address state of the server, (b) the address state of the client 1, (c) the address state of the client 2, (d) the state of the data link layer address table, and (e) the state of the network layer address table, before, during, and after the process according to the fourth embodiment.

DETAILED DESCRIPTION OF THE INVENTION

Hereinafter, the preferred embodiments of the present invention will be described with reference to the drawings. The embodiments described hereinafter are merely examples and, therefore, the present invention is not restricted thereto.

[First Embodiment]

Initially, an address management apparatus according to a first embodiment of the present invention will be described.

Figure 7:
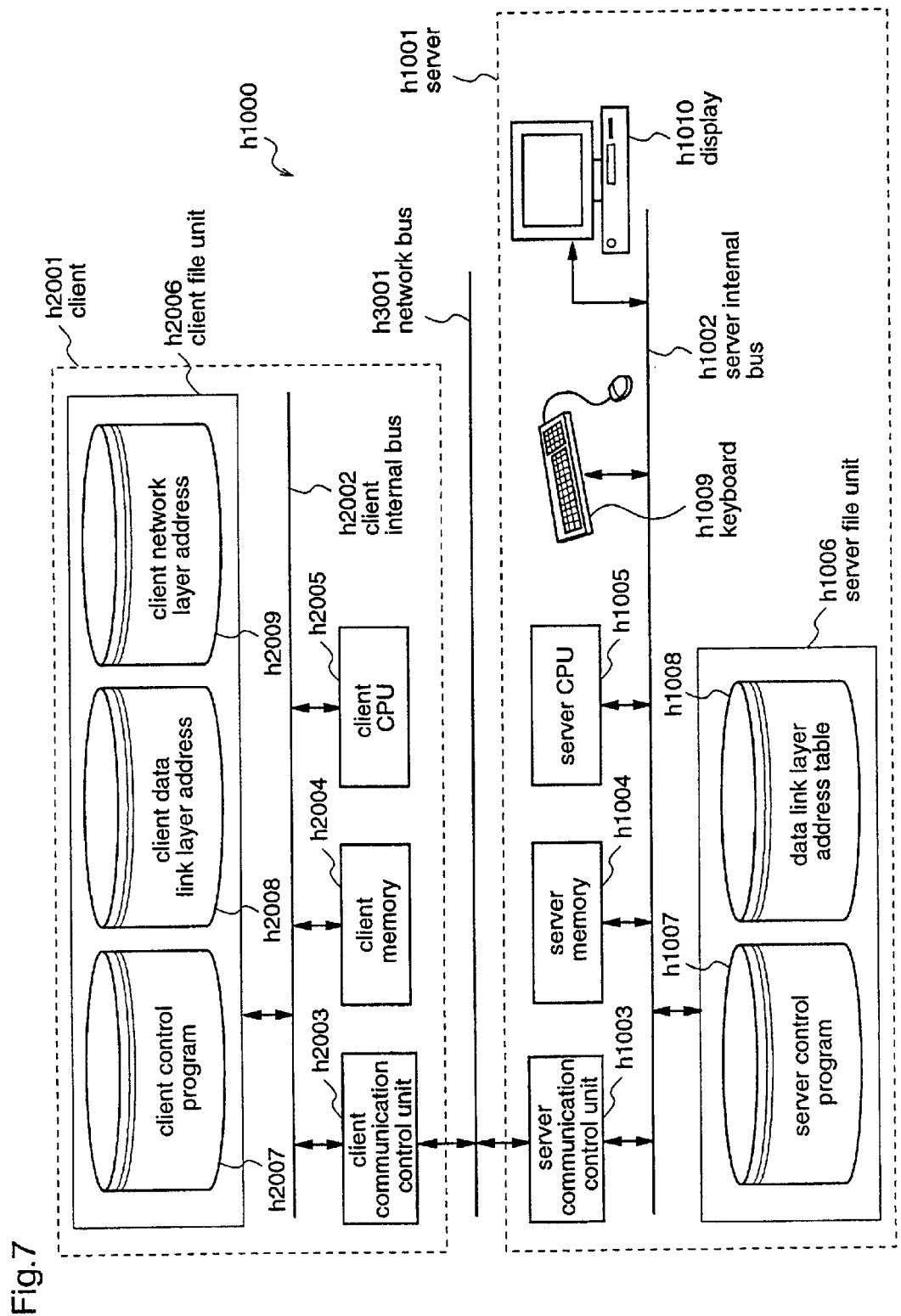
FIG. 7 is a diagram illustrating a hardware construction of the address management apparatus according to the first embodiment.

FIG. 7 is a block diagram illustrating a hardware construction of an address management apparatus h1000 according to the first embodiment. This first embodiment employs a server/client system, and the address management apparatus h1000 is composed of one server and plural clients. In FIG. 7, only one server and one client are shown.

The address management apparatus h1000 comprises a server h1001 which issues (makes) an instruction for changing a data link layer address, a client h2001 whose data link layer address is to be changed, and a network bus h3001 connecting the server h1001 and the client h2001.

In the server h1001, h1002 denotes an internal bus, h1003 denotes a server communication controller (control unit) connected to the network bus h3001, h1004 denotes a server memory, h1005 denotes a server CPU, h1009 denotes a keyboard for receiving an input from the network administrator, h1010 denotes a display for displaying an output to the network administrator, and h1006 denotes a server filing unit.

The server filing unit h1006 contains a server control program h1007 to be executed by the server, and a data link layer address table h1008.

In the client h2001, h2002 denotes an internal bus, h2003 denotes a client communication controller (control unit), h2004 denotes a client memory, h2005 denotes a client CPU, and h2006 denotes a client filing unit.

The client filing unit h2006 contains a client control program h2007 to be executed by the client, a client's data link layer address h2008, and a client's network layer address h2009.

Figure 1:
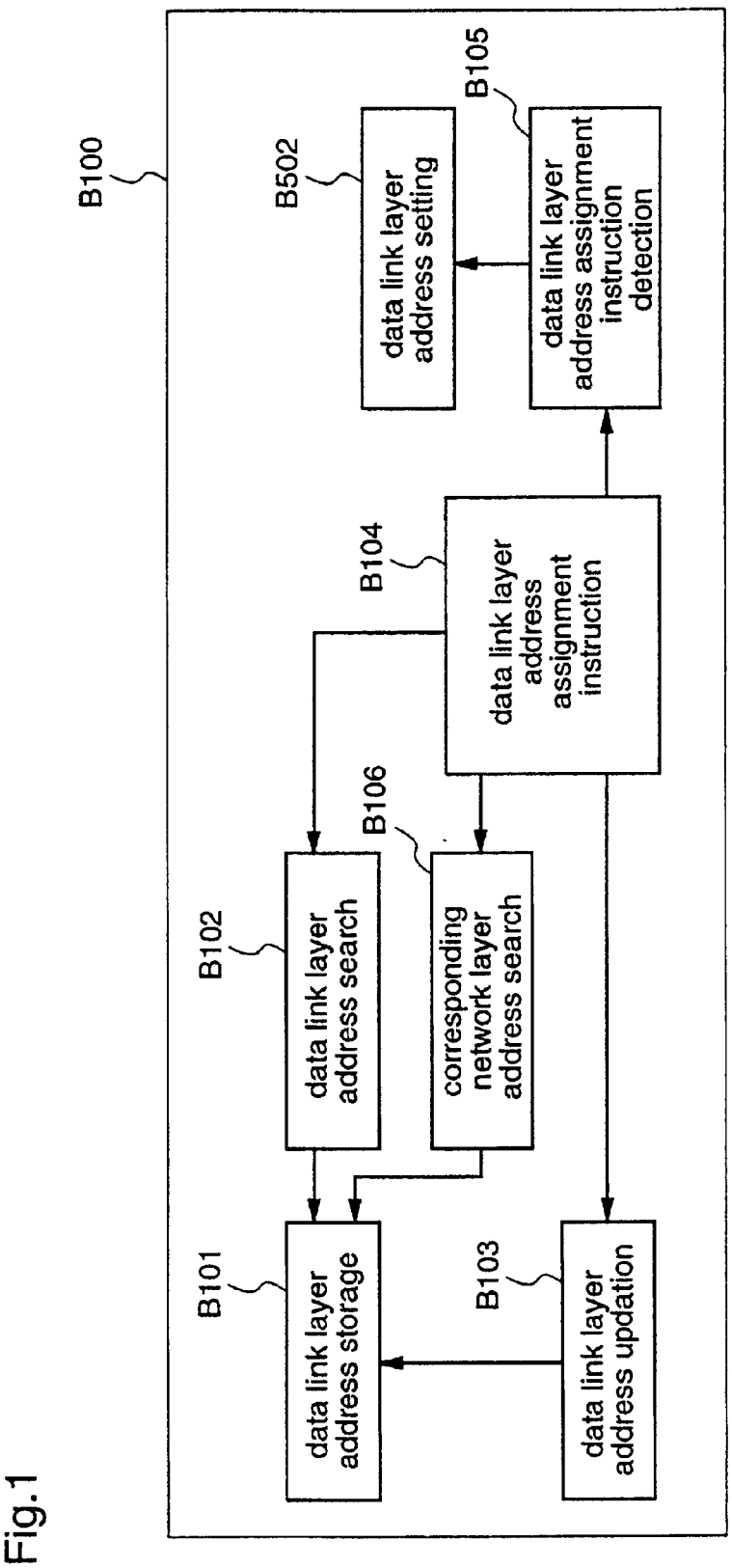
FIG. 1 is a block diagram illustrating an address management apparatus according to a first embodiment of the invention.

FIG. 1 is a block diagram illustrating the construction of an address management apparatus B100 according to the first embodiment.

In FIG. 1, B101 denotes a data link layer address storage means (unit) for storing the correspondence between data link layer addresses and network layer addresses in a data link layer address table. B102 denotes a data link layer address search means (unit) for searching the data link layer address table for an unused data link layer address. B103 denotes a data link layer address updation means (data link layer address updating unit) for updating the correspondence between a data link layer address and a network layer address in the data link layer address table. B106 denotes a corresponding network layer address search means (unit) for searching the data link layer address table for a network layer address corresponding to a designated data link layer address. B104 denotes a data link layer address assignment instruction means (unit) for instructing the data link layer address search means B102 to search for an unused data link layer address which does not correspond to the detected network layer address, for instructing the corresponding network layer address search means B106 to search for a network layer address corresponding to the designated data link layer address, and for transmitting a data link layer address assignment instruction which instructs a terminal that is specified by the corresponding network layer address to assign the detected unused data link layer address. B105 denotes a data link layer address assignment instruction detection means (unit) for detecting the data link layer address assignment instruction, and for extracting the data link layer address to be assigned, from the data link layer address assignment instruction. Further, B502 denotes a data link layer address setting means (unit) for setting the designated data link layer address on the terminal.

Figure 10A:
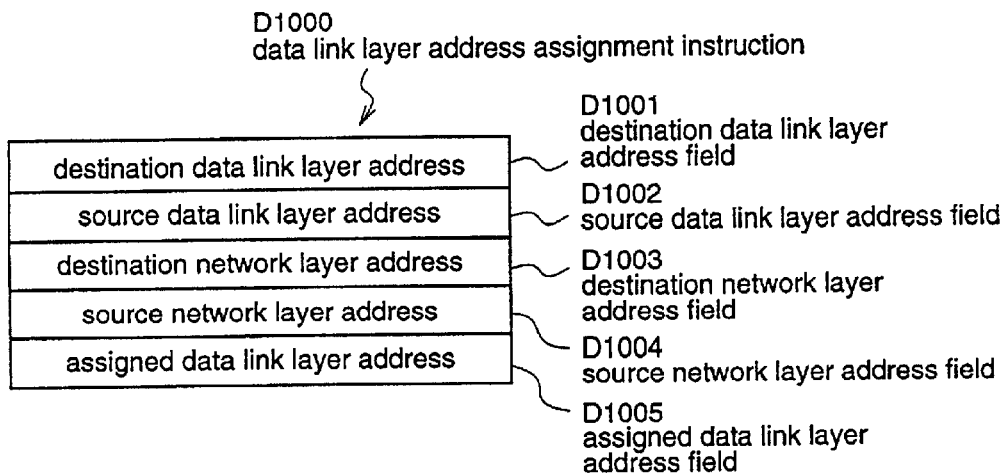
FIG. 10 is a diagram illustrating the constructions of a data link layer address assignment instruction and a data link layer address table according to the first embodiment.

FIG. 10(A) shows the construction of a data link layer address assignment instruction D1000.

The data link layer address assignment instruction D1000 is composed of a destination data link layer address field D1001 where a destination data link layer address is stored; a source data link layer address field D1002 where a source data link layer address is stored; a destination network layer address field D1003 where a destination network layer address is stored; a source network layer address field D1004 where a source network layer address is stored; and an assignment data link layer address field D1005 where a data link layer address to be assigned is stored.

Figure 10B:
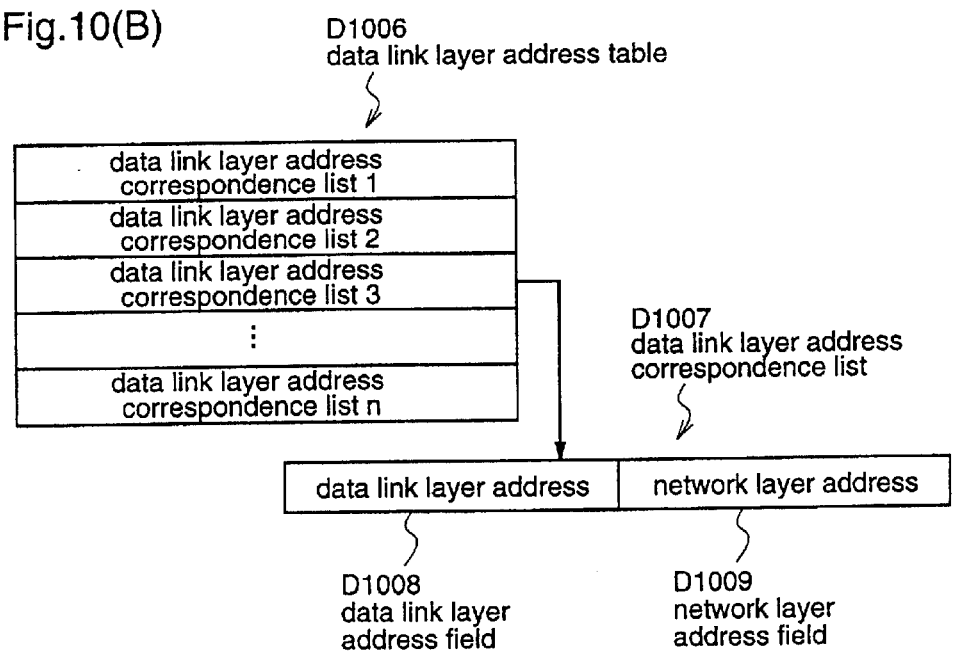

FIG. 10(B) shows the construction of a data link layer address table D1006.

The data link layer address table D1006 includes a plurality of data link layer address correspondence lists D1007. Each of the plurality of data link layer address correspondence lists D1007 comprise a data link layer address field D1008 where a data link layer address is stored, and a network layer address field D1009 where a network layer address corresponding to the data link layer address is stored.

Figure 8:
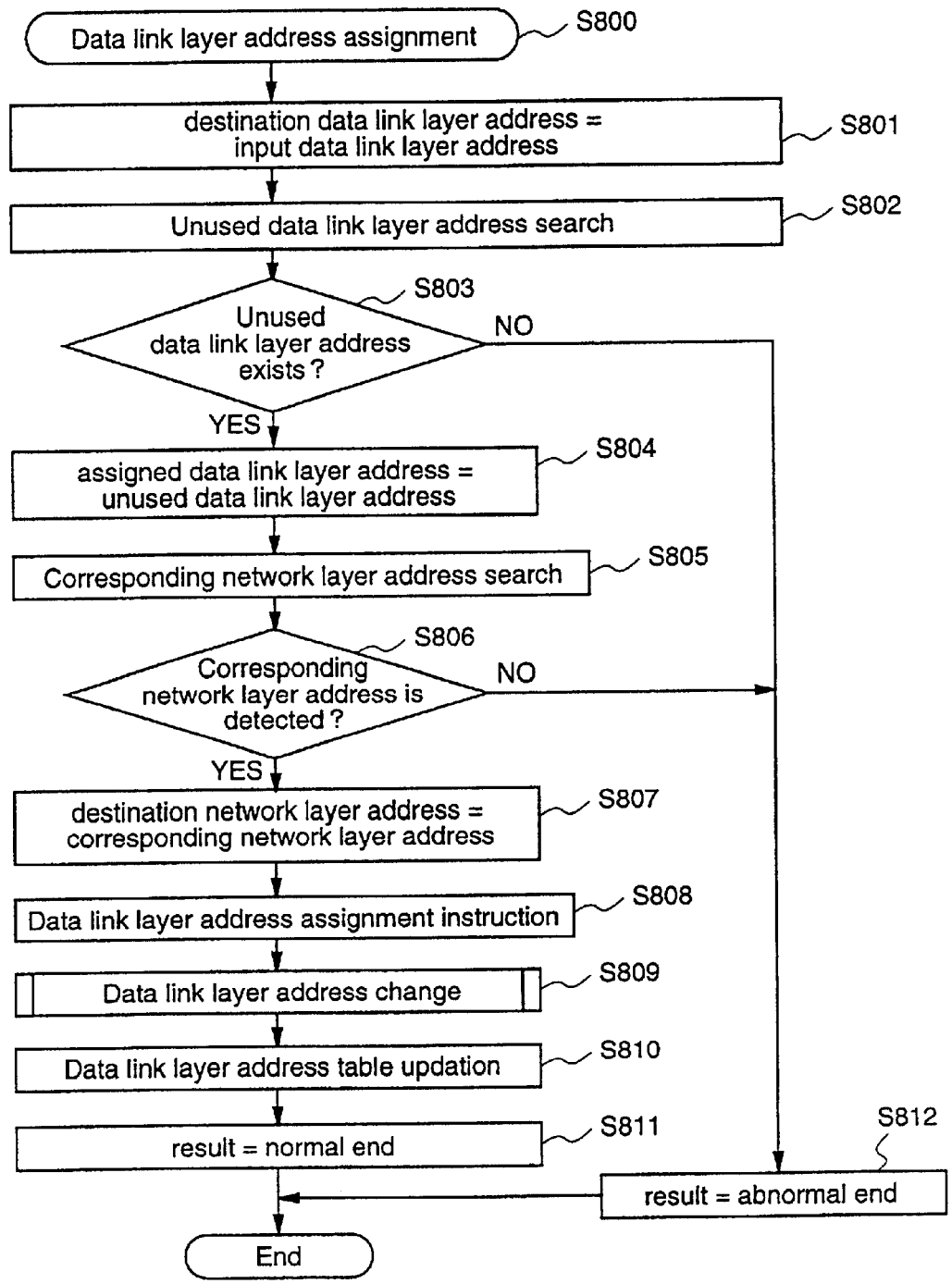
FIG. 8 is a flowchart for explaining an address management method according to the first embodiment.
Figure 9:
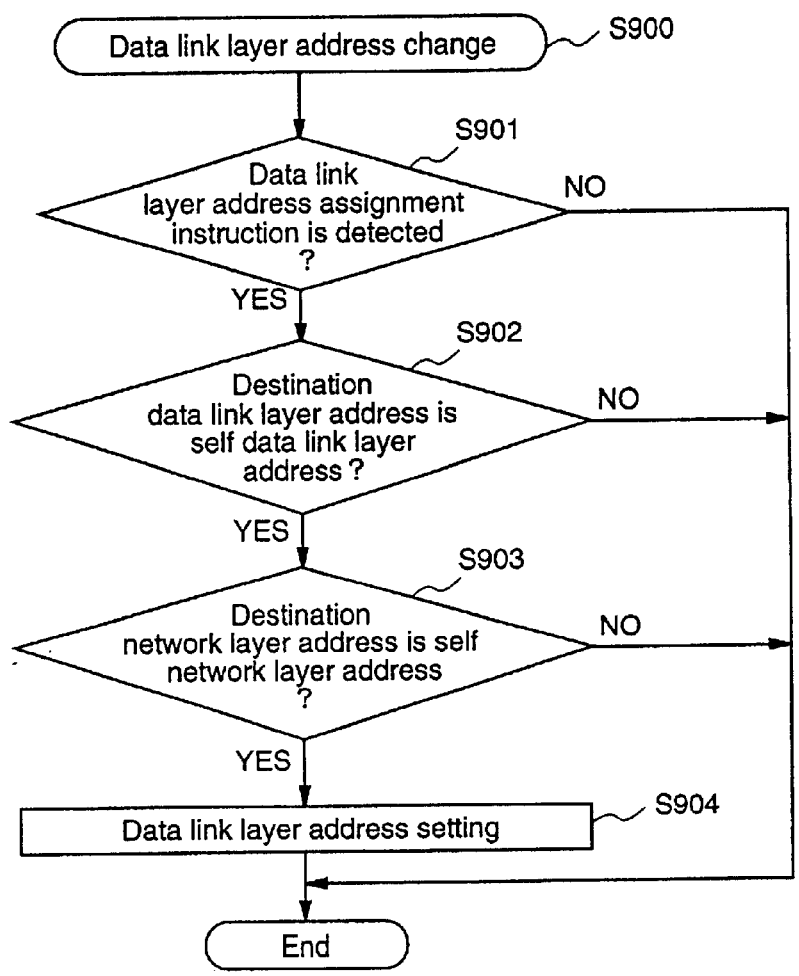
FIG. 9 is a flowchart for explaining the address management method according to the first embodiment.

FIG. 8 is a flowchart for explaining the operation of the whole address management apparatus B100, and FIG. 9 is a flowchart for explaining part of the operation shown in FIG. 8 in more detail.

The data link layer address assignment instruction means B104 sets an inputted data link layer address in the destination data link layer address field D1001 of the data link layer address assignment instruction D1000 (S801). Then, by using the data link layer address search means B102, the data link layer address table D1006 stored in the data link layer address storage means B101 is searched so as to detect whether an unused data link layer address which is not associated with a network layer address exists (S802). When an unused data link layer address is not detected, the process is ended as an abnormal end (S812). On the other hand, when an unused data link layer address is detected, the process goes to step S804. In step S804, the detected unused data link layer address is set in the assignment data link layer address field D1005 of the data link layer address assignment instruction D1000. Then, by using the corresponding network layer address search means B106, the data link layer address table D1006 stored in the data link layer address storage means B101 is searched so as to detect whether a network layer address corresponding to the inputted data link layer address exists (S805). When a corresponding network layer address is not detected, the process is ended as an abnormal end (S812). On the other hand, when a corresponding network layer address is detected, the process goes to step S807. In step S807, the detected network layer address is set in the destination network layer address field D1003 of the data link layer address assignment instruction D1000. Then, the data link address of the server itself is set in the source data link layer address field D1002 of the data link layer address assignment instruction D1000 while the network address of the server itself is set in the source network layer address field D1004 of the data link layer address assignment instruction D1000. Thereafter, the data link layer address assignment instruction D1000 is transmitted (S808).

Next, the data link layer address change step S809 shown in FIG. 8, which is the client's processing, will be described with reference to FIG. 9.

When the data link layer address assignment instruction detection means B105 does not detect a data link layer address assignment instruction, the data link layer address assignment instruction detection means B105 ends the process. On the other hand, when the data link layer address assignment instruction detection means B105 detects a data link layer address assignment instruction, the process goes to step S902 (S901). Then, the destination data link layer address field D1001 is extracted from the detected data link layer address assignment instruction D1000. When the destination data link layer address does not match the self data link layer address, the process is ended, and when the destination data link layer address matches the self data link layer address, the process goes to step S903 (S902). In step S903, the destination network layer address is read from the detected data link layer address assignment instruction D1000. When the destination network layer address does not match the self network layer address, the process is ended, and when the destination network layer address matches the self network layer address, the process goes to step S904 (S903). In step S904, the assignment data link layer address field D1005 is read from the detected data link layer address assignment instruction D1000 to be set as the self data link layer address (S904).

The description will now return to the server's processing.

After confirming that the data link layer address assignment instruction D1000 has been transmitted, the data link layer address assignment instruction means B104 instructs the data link layer address updation means B103 to delete the correspondence between the destination data link layer address and the destination network layer address, which are set in the data link layer address assignment instruction D1000 stored in the data link layer address storage means B101, and to enter the correspondence between the assignment data link layer address and the destination network layer address, which are set in the data link layer address assignment instruction D1000 (S810). Then, the data link layer address assignment instruction means B104 ends the process as a normal end (S811), whereby the data link layer address assignment process is completed.

Hereinafter, the above-described processing will be described with reference to FIG. 11.

FIG. 11 shows the state of the address management apparatus B100 before and after performing the process which will be described later.

FIG. 11(a1) shows the state of address setting of the server before the process to be described later, FIG. 11(b1) shows the state of address setting of the client 1, and FIG. 11(d1) shows the state of the data link layer address table of the server. For the sake of convenience, in the data link layer address table, the data link layer addresses are listed in ascending numeric order, and the data link layer address search means B102 searches the data link layer address table for the most-recent number among the data link layer addresses which are not associated with network layer addresses.

It is now assumed that a data link layer address DA2 is specified as a target data link layer address to be updated by the address administrator, another program, or the like.

The data link layer address assignment instruction means B104 of the server instructs the data link layer address search means B102 to search the data link layer address table for an unused data link layer address which is not associated with any network layer address, thereby obtaining a data link layer address DA3.

Then, the data link layer address assignment instruction means B104 of the server instructs the corresponding network layer address search means B106 to search the data link layer address table for a network layer address corresponding to the specified data link layer address DA2, thereby obtaining a network layer address NA2.

Then, the data link layer address assignment instruction means B104 of the server transmits a data link layer address assignment instruction for instructing the assignment of the detected unused data link layer address DA3 to a terminal specified by the network layer address NA2 corresponding to the specified data link layer address DA2.

Then, the data link layer address assignment detection means B105 of the client 1 detects the data link layer address assignment instruction, and extracts the data link layer address DA3 to be assigned from the data link layer address assignment instruction. Then, the data link layer address setting means B502 sets the data link layer address in the terminal.

The data link layer address assignment instruction means B104 of the server instructs the data link layer address updation means B103 to delete, from the data link layer address table, the correspondence between the data link layer address (DA2) and the network layer address (NA2) of the client 1 before the instruction of the assignment by the data link layer address assignment instruction. Thereafter, the data link layer address instruction means B104 instructs the data link layer address updation means B103 to enter, in the data link layer address table D1006, the correspondence between the data link layer address (DA3), which is to be assigned, and the network layer address (NA2).

FIG. 11(a2) shows the state of address setting of the server after the above-mentioned process, FIG. 11(b2) shows the state of address setting of the client 1 after the process, and FIG. 11(d2) shows the state of the data link layer address table of the server after the process.

Since the address management apparatus B100 (h1000) according to the first embodiment operates in the manner as described above, the address management apparatus B100 can update the data link layer address through the network while maintaining the one-to-one correspondence between the data link layer address and the network layer address. Although this first embodiment relates to an address management apparatus, the present invention is not restricted to the above-described construction of the address management apparatus of the first embodiment, and it is also possible to construct a method for implementing the above-described operation.

While in this first embodiment a data link layer and a network layer, which are the second layer and the third layer of the OSI reference model, respectively, are described, the present invention is also applicable to other layers of the OSI reference model for which a one-to-one correspondence should be maintained between a lower layer address and an upper layer address.

[Second Embodiment]

Next, a description will be given of an address management apparatus according to a second embodiment of the present invention, in which a network layer address table h1011 containing network layer addresses associated with data link layer addresses is included in the filing unit h1006 of the hardware construction of the address management apparatus h1000 according to the first embodiment.

Figure 2:
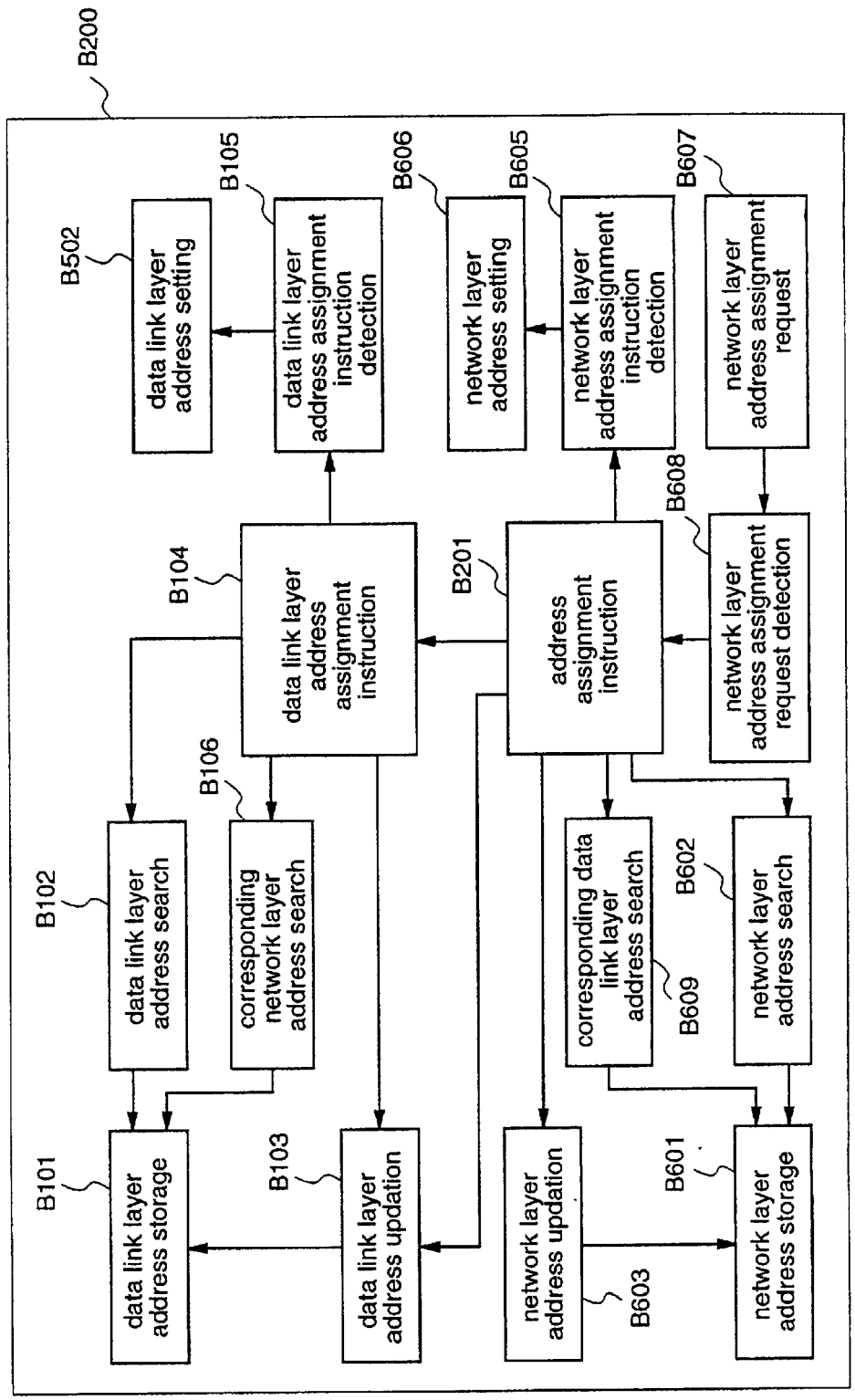
FIG. 2 is a block diagram illustrating an address management apparatus according to a second embodiment of the invention.
Figure 12:
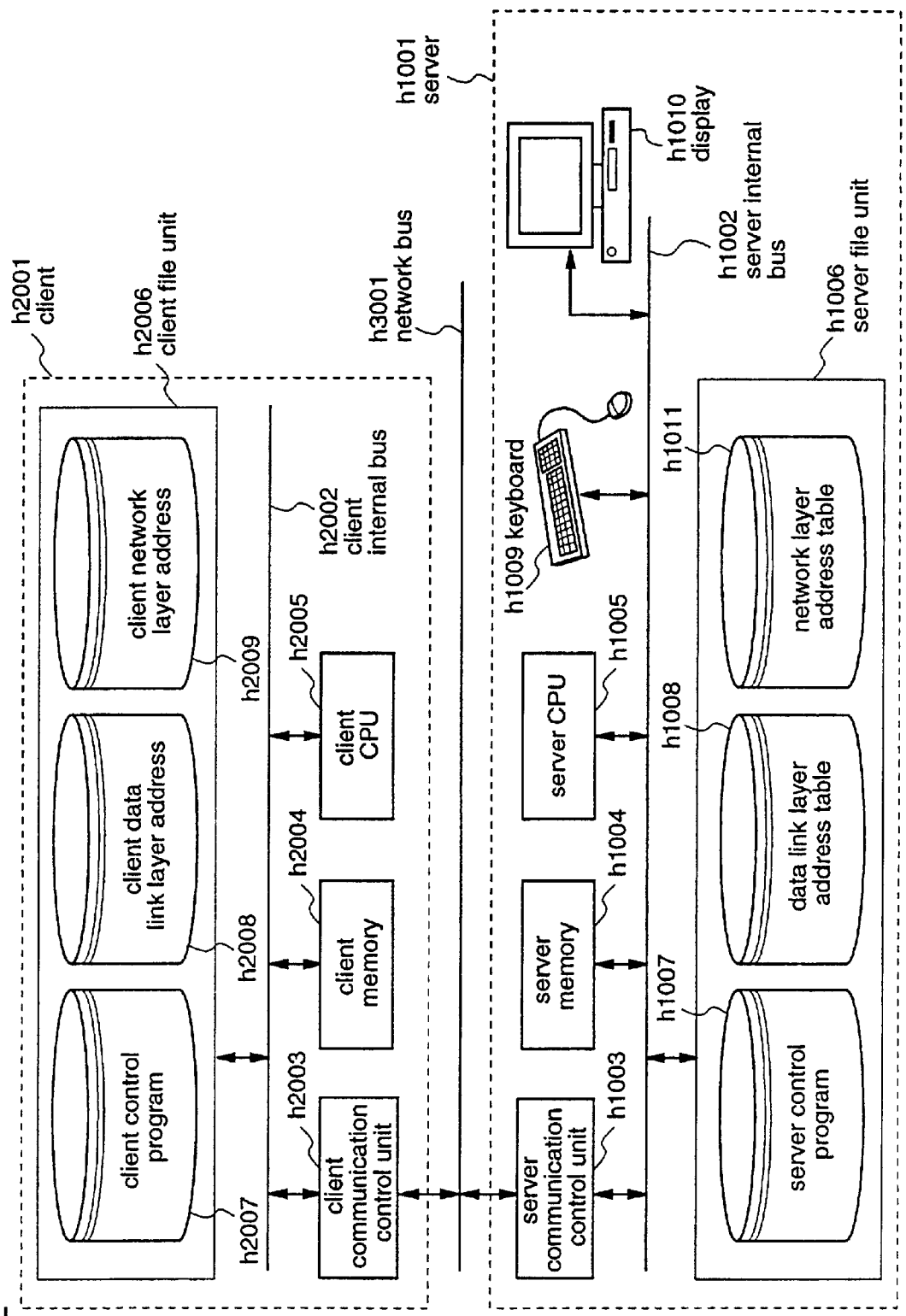
FIG. 12 is a diagram illustrating a hardware construction of the address management apparatus according to the second embodiment.

FIG. 12 is a diagram illustrating the hardware construction of the address management apparatus according to the second embodiment, and FIG. 2 is a block diagram illustrating the construction of the address management apparatus.

In FIG. 2, an address management apparatus B200 according to the second embodiment comprises a data link layer address storage means (unit) B101, a data link layer address search means (unit) B102, a data link layer address updation means (unit) B103, a data link layer address assignment instruction means (unit) B104, a data link layer address assignment instruction detection means (unit) B105, a corresponding network layer address search means (unit) B106, a data link layer address setting means (unit) B502, a network layer address storage means (unit) B601, a network layer address search means (unit) B602, a network layer address updation means (unit) B603, a network layer address assignment instruction detection means (unit) B605, a network layer address setting means (unit) B606, a network layer address assignment request means (unit) B607, a network layer address assignment request detection means (unit) B608, a corresponding data link layer address search means (unit) B609, and an address assignment instruction means (unit) B201.

The data link layer address setting means B502, the network layer address storage means B601, the network layer address search means B602, the network layer address updation means B603, the network layer address assignment instruction detection means B605, the network layer address setting means B606, the network layer address assignment request means B607, the network layer address assignment request detection means B608, and the corresponding data link layer address search means B609 according to this second embodiment are identical to those already described with respect to the second prior art and, therefore, repeated description is not necessary.

Figure 15:
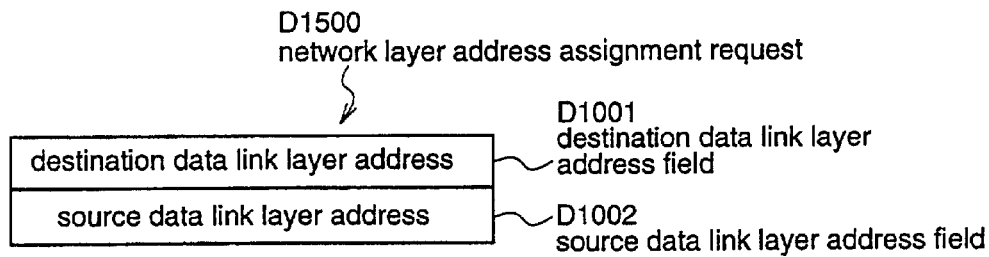
FIG. 15 is a diagram illustrating the constructions of a network layer address assignment request, a network layer address table, and a network layer address assignment instruction according to the second embodiment.
Figure 15:
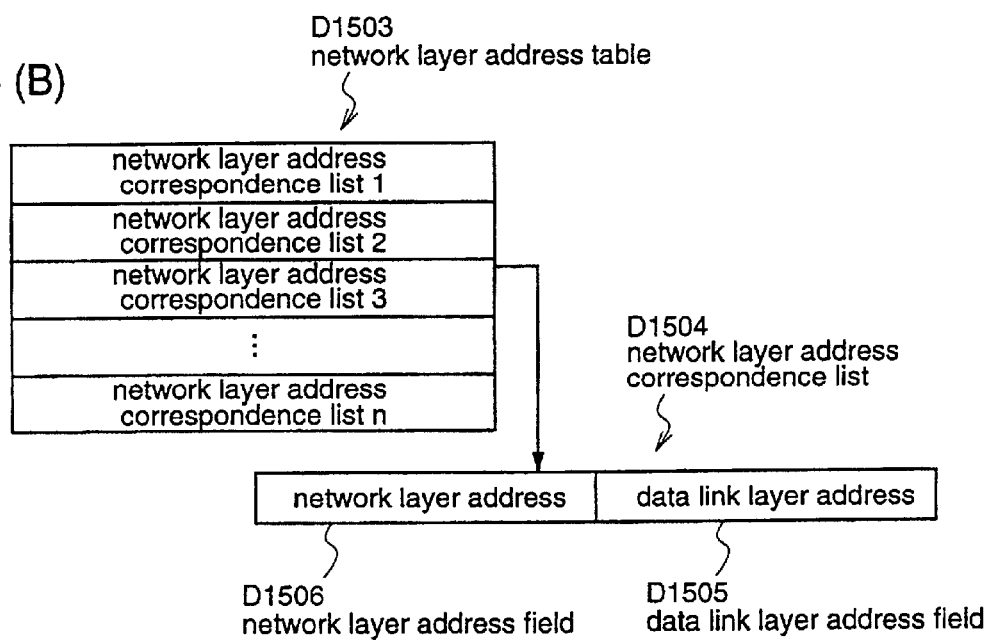
Figure 15:
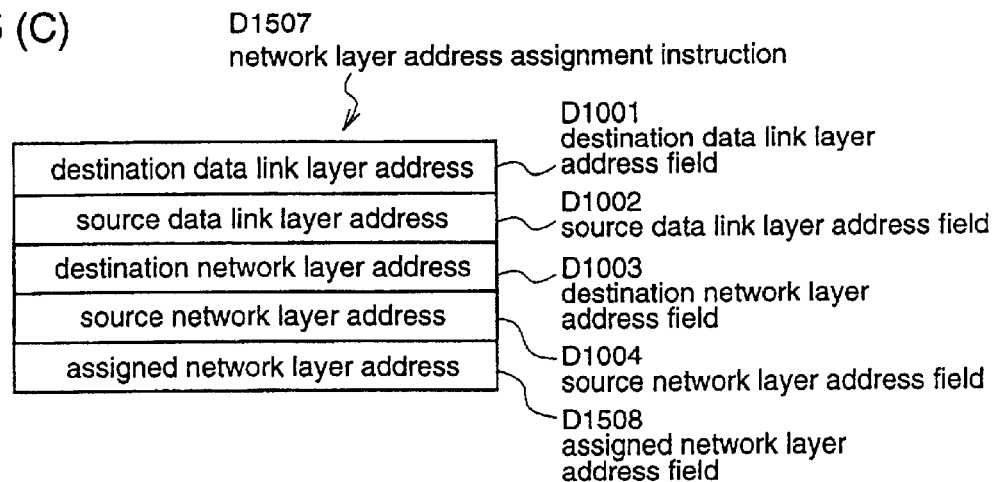

FIG. 15(A) shows the construction of a network layer address assignment request D1500.

The network layer address assignment request D1500 is composed of a destination data link layer address field D1001 where a destination data link layer address is stored, and a source data link layer address field D1002 where a source data link layer address is stored.

FIG. 15(B) shows the construction of a network layer address table D1503.

The network layer address table D1503 stores a plurality of network layer address correspondence lists D1504, and each of the network layer address correspondence lists D1504 comprises a data link layer address field D1505 where a data link layer address is stored and a network layer address field D1506 where a network layer address corresponding to the data link layer address is stored.

FIG. 15(C) shows the construction of a network layer address assignment instruction D1507.

The network layer address assignment instruction D1507 is composed of a destination data link layer address field D1001 where a destination data link layer address is stored, a source data link layer address field D1002 where a source data link layer address is stored, a destination network layer address field D1003 where a destination network layer address is stored, a source network layer address field D1004 where a source network layer address is stored, and an assignment network layer address field D1508 where a network layer address to be assigned is stored.

Figure 13:
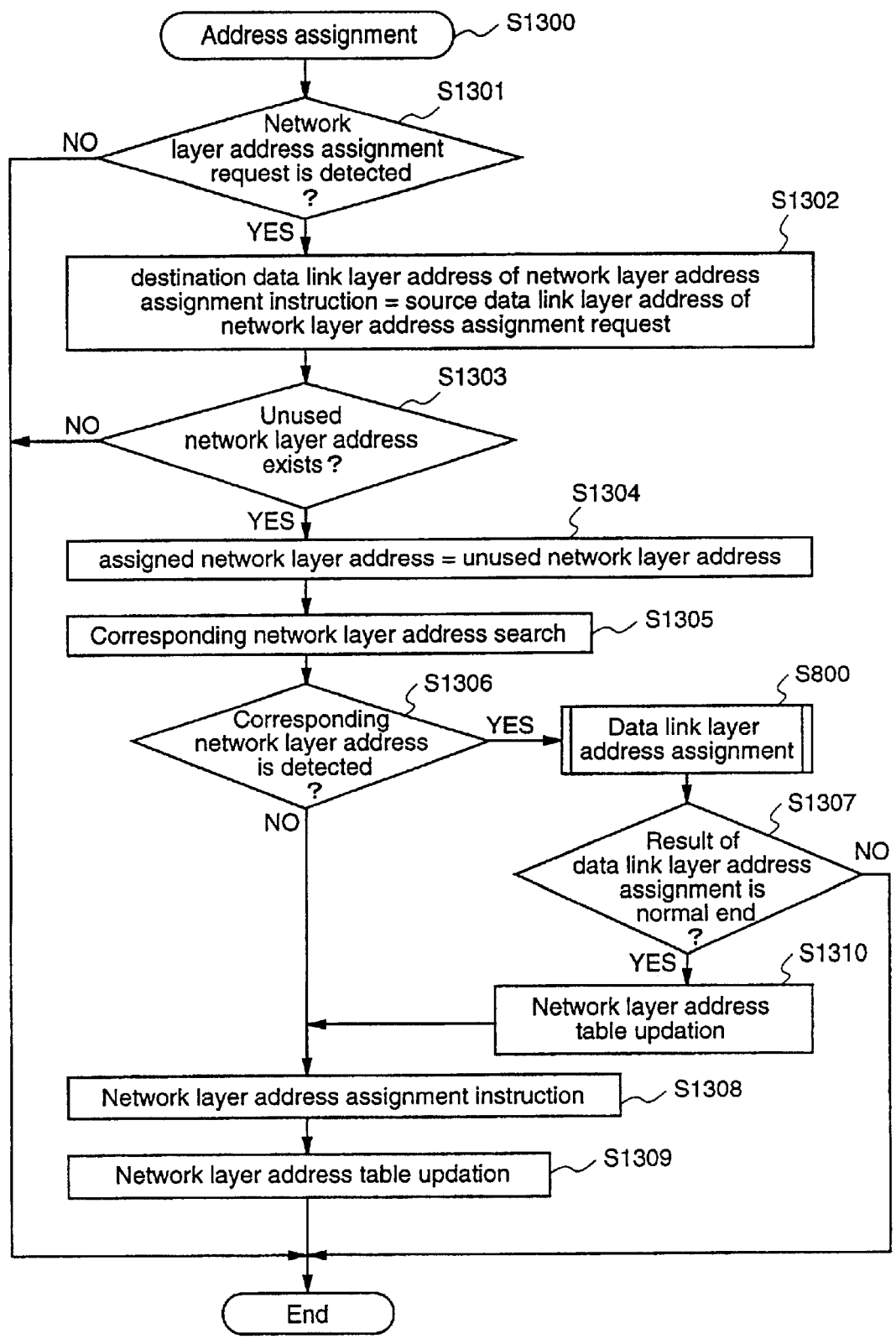
FIG. 13 is a flowchart for explaining an address management method according to the second embodiment.
Figure 14:
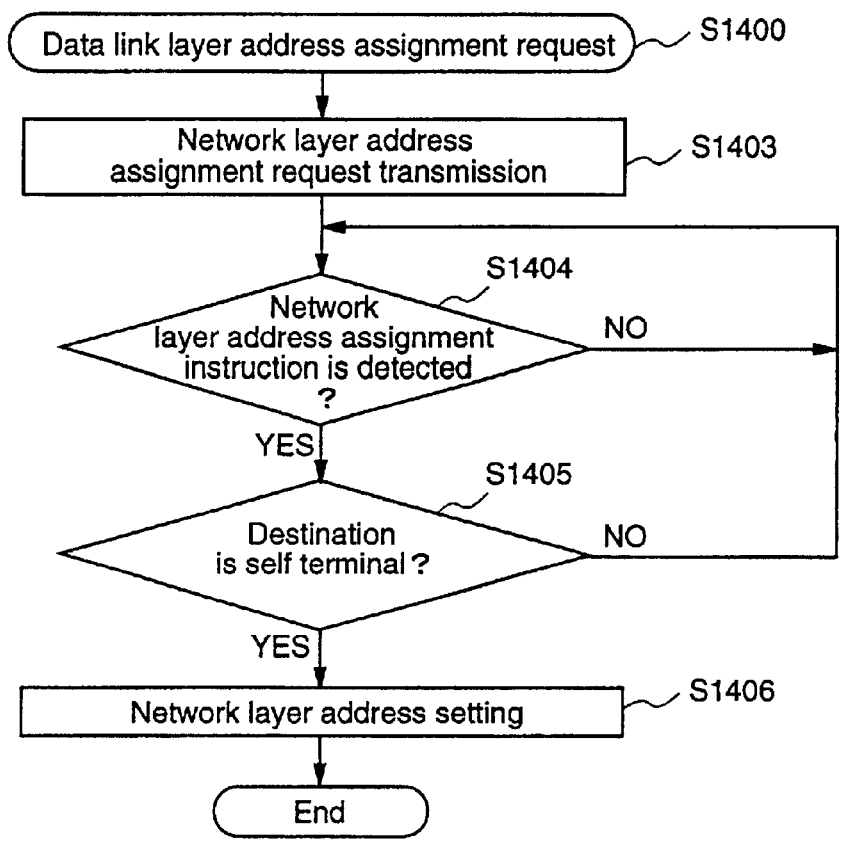
FIG. 14 is a flowchart for explaining the address management method according to the second embodiment.

FIG. 13 is a flowchart for explaining the operation of the whole address management apparatus, and FIG. 14 is a flowchart for explaining part of the operation of FIG. 13 in more detail.

Initially, a network layer address assignment request D1500 is transmitted from the network layer address assignment request means B607 of the client (S1403) (refer to FIG. 14).

In the server, the network layer address assignment request detection means B608 detects the network layer address assignment request D1500 from the client, extracts the source data link layer address, and outputs the source data link layer address to the address assignment instruction means B201 (S1301).

The address assignment instruction means B201 sets the data link layer address supplied from the network layer address assignment request detection means B608 in the destination data link layer address field D1001 of the network layer address assignment instruction D1507 (S1302), and instructs the network layer address search means B602 to search the network layer address table D1503 stored in the network layer address storage means B601, for an unused network layer address which is not associated with any data link layer address (S1303).

When an unused network layer address is not detected, the process is ended. On the other hand, when an unused network layer address is detected, the process goes to step S1304.

Then, the address assignment instruction means B201 sets the unused network layer address detected in step S1303 in the assignment network layer address field D1508 of the network layer address assignment instruction D1507 (S1304), and instructs the corresponding data link layer address search means B609 to search the network layer address table D1503 stored in the network layer address stored means B601 for a network layer address corresponding to the source data link layer address of the detected network layer address assignment request d1500 (S1305).

When a corresponding network layer address is detected, the process goes to step S800 (data link layer address assignment process). On the other hand, when a corresponding network layer address is not detected, the process goes to step S1308 (network layer address assignment instruction process).

When the result of the data link layer address assignment process at step S800 is an abnormal end, the process is ended. On the other hand, when the result of the data link address assignment process at step S800 is a normal end, the data link layer address to be assigned is obtained (S1310), followed by step S1308. Since there is no client using the same data link layer address at this point of time, the network layer address assignment instruction, which instructs the assignment of the unused network layer address detected in step S1303, is transmitted to the data link layer address which has sent the network layer address assignment request D1500 (S1308).

The description will now return to the client's processing.

The network layer address assignment instruction detection means B605 detects the network layer address assignment instruction. When the network layer address assignment instruction is directed to the self client, the network layer address is set by using the network layer address setting means B606 (S1404, S1405, S1406).

In the server, after transmitting the network layer address assignment instruction, the network address of the client to which the data link layer address assignment instruction is transmitted and the network address of the client to which the network layer address assignment instruction is transmitted are updated by using the network layer address updation means B603. After transmitting the data link layer address assignment instruction, the network address of the client to which the data link layer address assignment instruction is transmitted is updated by using the data link layer address updation means B103 (S1309).

The above-mentioned processing will be described with reference to FIG. 16.

FIG. 16 shows the state of the address management apparatus before, during, and after a process which will be described later.

More specifically, FIG. 16(a1) shows the state of address setting of the server before the process to be described later, FIG. 16(b1) shows the state of address setting of the client 1, FIG. 16(c1) shows the state of address setting of the client 2, FIG. 16(d1) shows the state of the data link layer address table of the server, and FIG. 16(e1) shows the state of the network layer address table of the server.

For the sake of convenience, it is premised that, in the network layer address table, the network layer addresses are listed in ascending numeric order like the data link layer addresses, and search is performed by starting from the most-recent address.

FIG. 16 shows the states of the server, client 1, client 2, server's data link layer address table, and server's network layer address table, before and after the process described below.

When the client 2 having a data link layer address DA2 transmits a network layer address assignment request D1500 to the server, the network layer address assignment request detection means B608 of the server detects the network layer address assignment request D1500, and extracts the source data link layer address DA2. The extracted data link layer address DA2 is set in the destination data link layer address field D1001 of the network layer address assignment instruction D1507.

Initially, the address assignment instruction means B201 instructs the network layer address search means B602 to search for an unused network layer address which is not associated with any data link layer address.

Hereinafter, a description will be given of the case where NA3 is detected as a network layer address to be assigned, from the network layer address table shown in FIG. 16(e1).

The detected, unused network layer address NA3 is set in the assignment network layer address field D1508 of the network layer address assignment instruction D1507. Further, the address assignment instruction means B201 instructs the corresponding data link layer address search means B609 to search for a network layer address corresponding to the source data link layer address DA2 of the network layer address assignment request D1500.

Hereinafter, a description will be given of the case where NA2 is detected as an unused network layer address to be assigned from the network layer address table shown in FIG. 16(e1).

When a network layer address corresponding to the data link layer address DA2 of the source of the network layer address assignment request D1500 is detected, the address assignment instruction means B201 inputs the data link layer address DA2 in the data link layer address assignment instruction means B104. The data link layer address assignment instruction means B104 instructs the client using the inputted data link layer address to set an unused data link layer address which is different from the DA2, thereby making the data link layer address DA2 unassigned.

Hereinafter, a description will be given of the case where DA3 is detected as a data link layer address to be assigned to the client 1 which has used the data link layer address DA2 from the data link layer address table shown in FIG. 16(d1).

Upon receipt of the data link layer address assignment instruction from the server, the data link address of the client 1 is changed from DA2, which is also used by the client 2, to DA3.

The state of the address management apparatus at this point of time is shown in FIG. 16.

To be specific, FIG. 16(a2) shows the state of address setting of the server, FIG. 16(b2) shows the state of address setting of the client 1, FIG. 16(*c*2) shows the state of address setting of the client 2, FIG. 16(*d*2) shows the state of the data link layer address table of the server, and FIG. 16(*e*2) shows the state of the network layer address table of the server.

Further, the address assignment instruction means B201 sets the data link layer address and the network layer address of the server itself in the source data link layer address field D1002 and the source network layer address field D1004 of the network layer address assignment instruction D1507, respectively, and transmits the network layer address assignment instruction D1507.

Upon receipt of the network layer address assignment instruction D1507 from the server, the client 2 confirms that the destination data link layer address field D1001 of the network layer address assignment instruction D1507 matches the data link layer address of the client 2, and extracts the network layer address NA3 from the assignment network layer address field D1508, and sets the network layer address NA3 in the network layer address field of the client 2. Finally, the correspondence between the data link layer address and the network layer address which has been changed in the above-mentioned processing is updated so that a contradiction does not occur between the data link layer address table and the network layer address table, by using the data link layer address updation means B103 and the network layer address updation means B603.

The state of the address management apparatus after the above-described processing is shown in FIG. 16.

To be specific, FIG. 16(*a*3) shows the state of address setting of the server, FIG. 16(*b*3) shows the state of address setting of the client 1, FIG. 16(*c*3) shows the state of address setting of the client 2, FIG. 16(*d*3) shows the state of the data link layer address table of the server, and FIG. 16(*e*3) shows the state of the network layer address table of the server.

Since the address management apparatus B200 according to the second embodiment operates as described above, an unused data link layer address is automatically assigned to a client which is given a data link layer address that is also used by another client, and is associated with a network layer address. Further, an updated network layer address is automatically assigned to a client which is given a data link layer that is also used by another client, and transmits a network layer address assignment request. Although this second embodiment relates to an address management apparatus, the present invention is not restricted to the construction of the address management apparatus of the second embodiment as described above, and it is also possible to construct a method for implementing the above-described operation.

[Third Embodiment]

Hereinafter, an address management apparatus according to a third embodiment, which has a network layer address assignment request delay means in addition to the constituents of the address management apparatus of the second embodiment, will be described with reference to the drawings.

Figure 3:
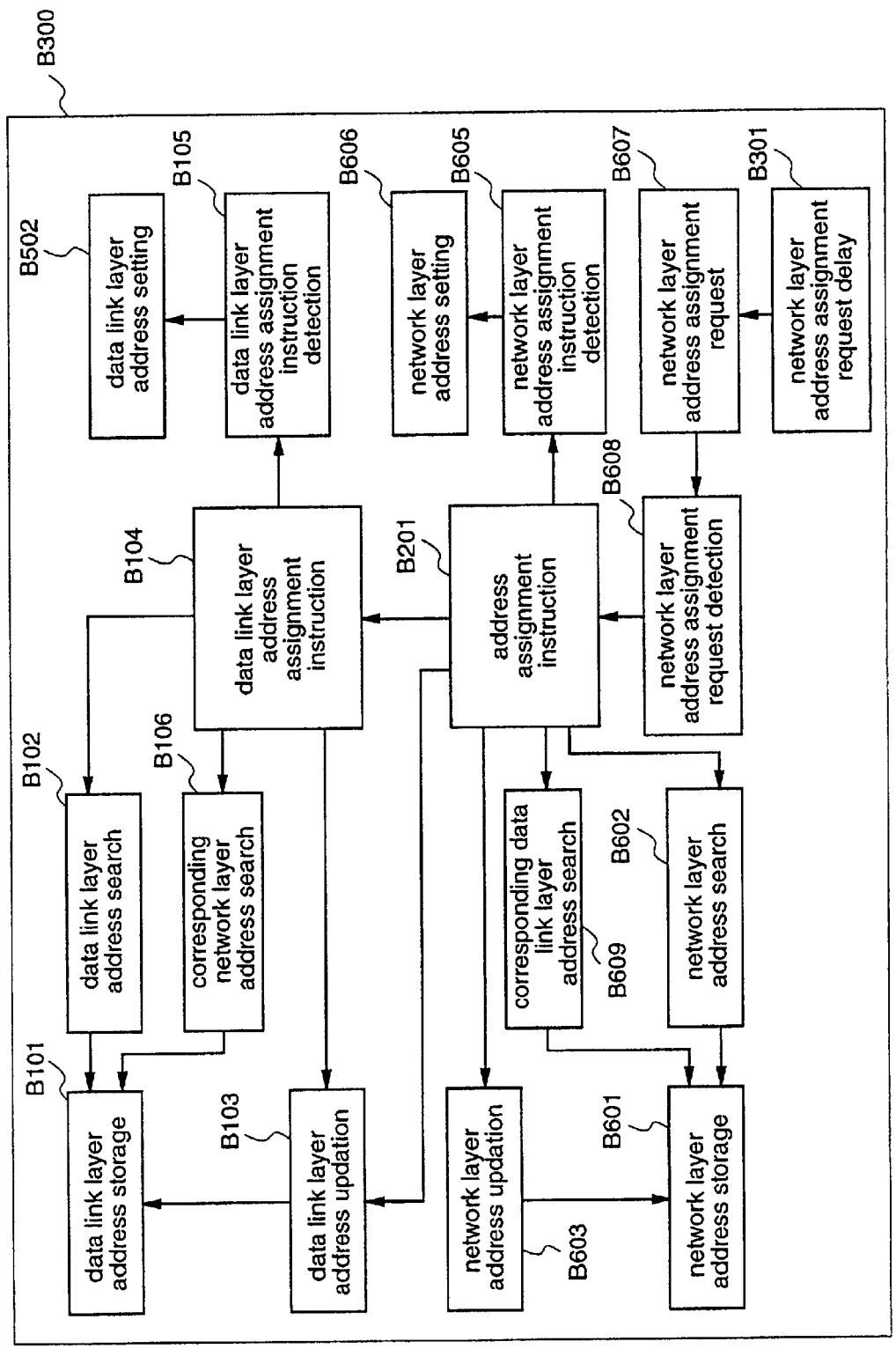
FIG. 3 is a block diagram illustrating an address management apparatus according to a third embodiment of the invention.

FIG. 3 is a block diagram illustrating the construction of an address management apparatus B300 according to the third embodiment.

This address management apparatus B300 includes a network layer address assignment request delay means (unit) B301 for detecting a network layer address assignment request on the connected network, extracting the source data link layer address of the detected network layer address assignment request, and delaying transmission of a network layer address assignment request of the self terminal when the extracted data link layer address is identical to the data link layer address of the self terminal.

Figure 17:
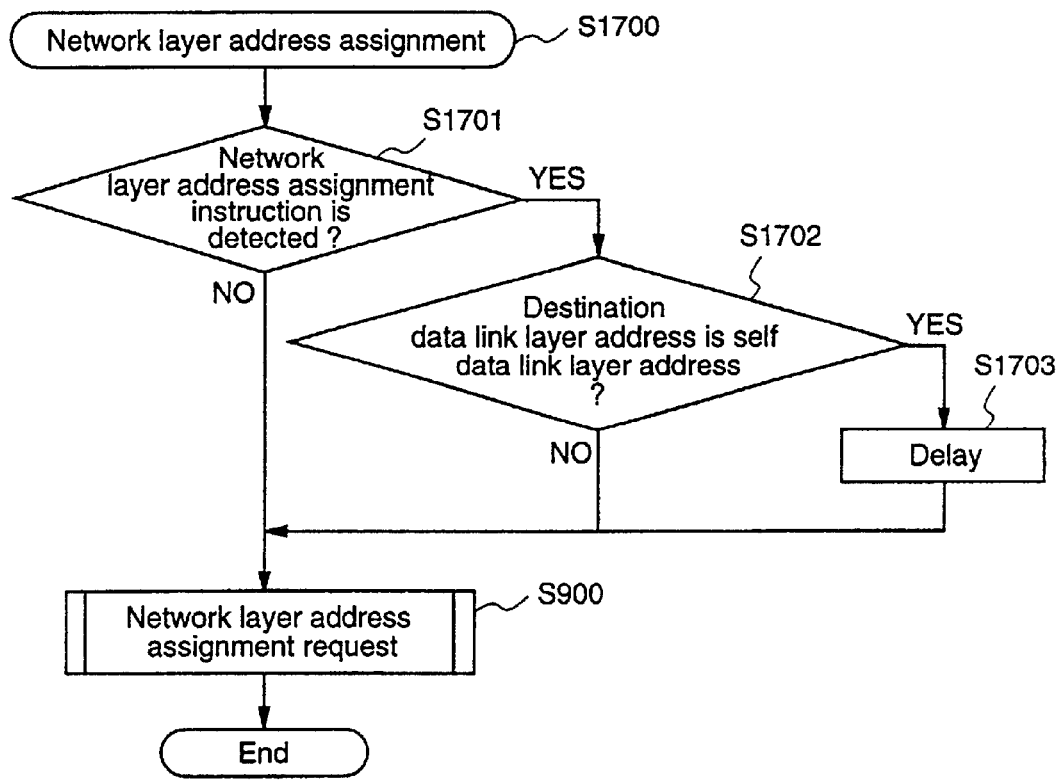
FIG. 17 is a flowchart for explaining an address management method according to the third embodiment.

FIG. 17 is a flowchart for explaining, in detail, the operation of the address management apparatus B300 of the third embodiment relating to the network layer address assignment request delay process.

Before transmitting a network layer address transmission request, a network layer address assignment request or a network layer address assignment instruction is detected from messages on the network (step S1701). When neither a network layer address assignment request D1500 nor a network layer address assignment instruction D1507 is detected, the process goes to step S900.

In the case where either a network layer address assignment request D1500 or a network layer address assignment instruction D1507 is detected, when the detected message is the network layer address assignment request D1500, the source data link layer address field D1002 is extracted; on the other hand, when the detected message is the network layer address assignment instruction D1507, the destination data link layer address field D1001 is extracted (step S1702).

When the extracted data link layer address does not match the self data link layer address, the process goes to step S900. When the extracted data link layer address matches the self data link layer address, a delay process is executed under a predetermined condition (step S1703).

Since the process of assigning the network layer address to the terminal which has made the network layer address assignment request is identical to that already described for the second embodiment, repeated description is not necessary.

Hereinafter, the processing according to this third embodiment will be described with reference to FIGS. 3, 17, and 18.

FIG. 18(*a*1) shows the address state of the server before the process which will be described later, FIG. 18(*b*1) shows the address state of the client 1, FIG. 18(*c*1) shows the address state of the client 2, FIG. 18(*d*1) shows the state of the data link layer address table of the server, and FIG. 18(*e*1) shows the state of the network layer address table of the server.

As shown in FIGS. 18(*b*1) and 18(*c*1), the same data link layer address DA1 is set on the client 1 and the client 2, and the network layer address is in the NULL state ("NULL" means that the network layer address is not set yet), and both of these clients 1 and 2 can transmit a network layer address assignment request D1500.

When the client 1 transmits a network layer address assignment D1500 request prior to the client 2, the client 2 receives the network layer address assignment request outputted from the client 1 and does not transmit a network layer address assignment request until the client 1 and the server complete the process relating to network layer address assignment.

FIG. 18 further shows the state where the process of assigning the network layer address to the client 1 is ended.

To be specific, FIG. 18(*a*2) shows the address state of the server at this point of time, FIG. 18(*b*2) shows the address state of the client 1, FIG. 18(*c*2) shows the address state of the client 2, FIG. 18(*d*2) shows the state of the data link layer address table of the server, and FIG. 18(*e*2) shows the state of the network layer address table of the server.

FIG. 18 further shows the state where the process of assigning the data link layer address to the client 1 is ended during the process of assigning the network layer address from the client 2.

To be specific, FIG. 18(*a*3) shows the address state of the server at this point of time, FIG. 18(*b*3) shows the address state of the client 1, FIG. 18(*d*3) shows the state of the data link layer address table of the server, FIG. 18(*d*3) shows the state of the data link layer address table of the server, and FIG. 18(*e*3) shows the state of the network layer address table of the server.

Furthermore, FIG. 18 shows the state when the process of assigning the network layer address to the client 2 is ended.

To be specific, FIG. 18(*a*4) shows the address state of the server after the above-described process, FIG. 18(*b*4) shows the address state of the client 1, FIG. 18(*c*4) shows the address state of the client 2, FIG. 18(*d*4) shows the state of the data link layer address table of the server, and FIG. 18(*e*4) shows the state of the network layer address table of the server.

Since the address management apparatus B300 according to the third embodiment operates as described above, even when the same data link layer address is set on plural terminals, a network layer address can be assigned to each terminal. Further, although this third embodiment relates to an address management apparatus, the present invention is not restricted to the construction of the address management apparatus of the third embodiment, and it is also possible to construct a method for implementing the above-described operation.

While in this third embodiment two terminals are given the same data link layer address, even when three or more terminals are given the same data link layer address, the above-described network layer address assignment can be performed by successively assigning a network layer address and a data link layer address to each of these terminals.

[Fourth Embodiment]

Hereinafter, an address management apparatus according to a fourth embodiment of the invention, in which an address detection means is added to the address management apparatus of the third embodiment, will be described with reference to the drawings.

Figure 4:
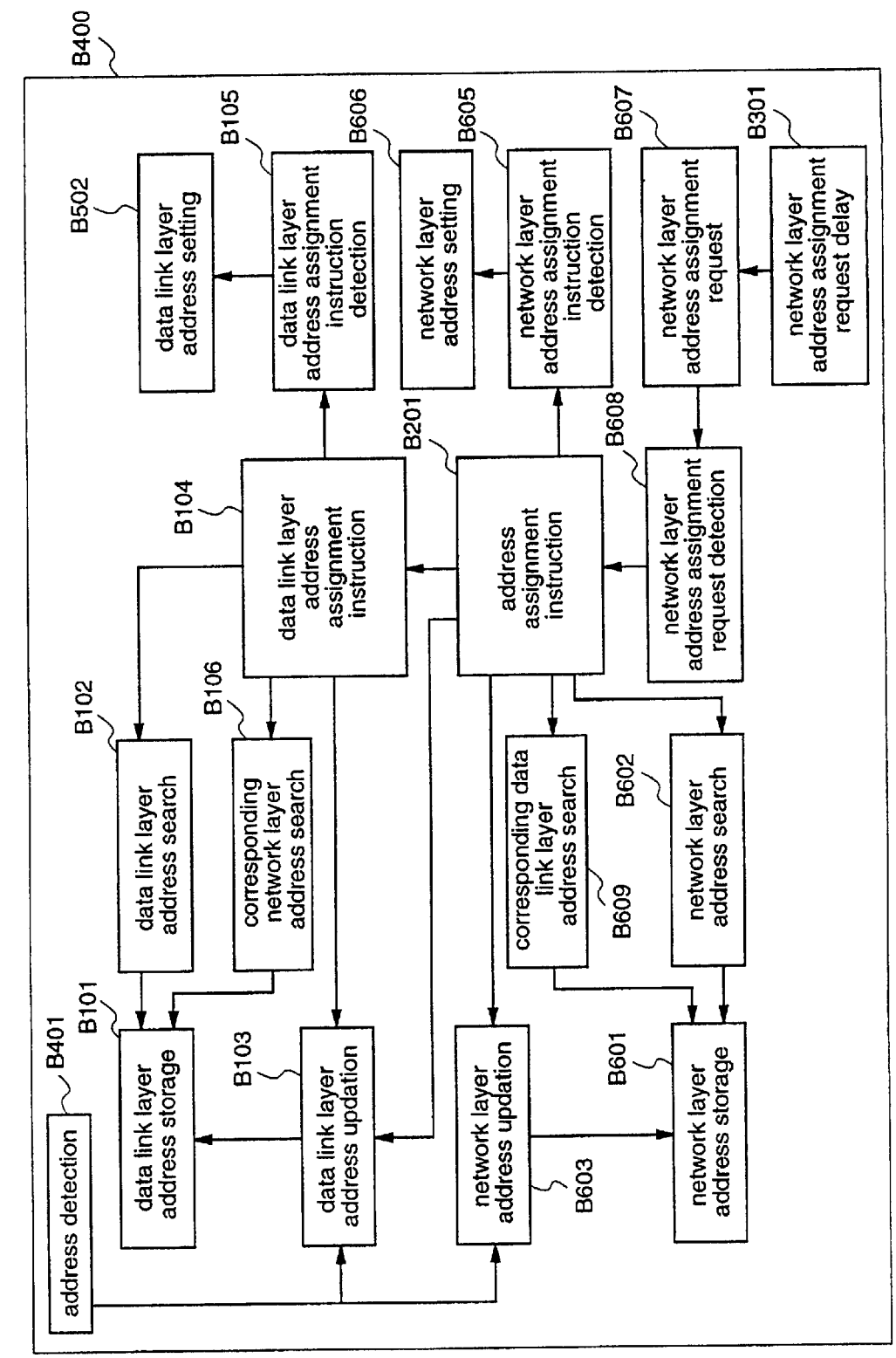
FIG. 4 is a block diagram illustrating an address management apparatus according to a fourth embodiment of the invention.
Figure 5:
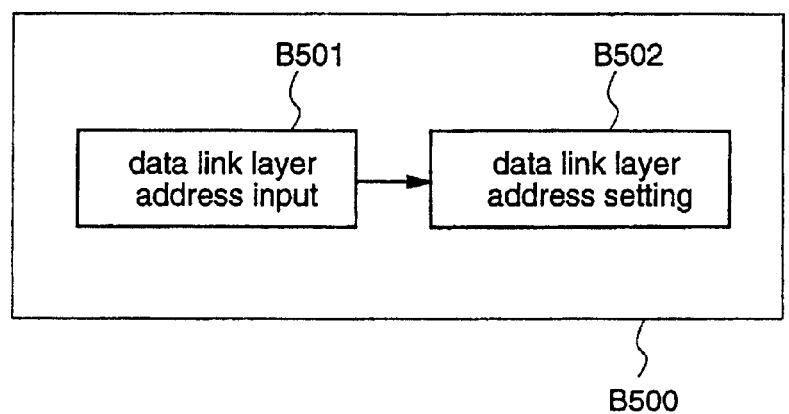
FIG. 5 is a block diagram illustrating a data link layer address management apparatus according to the prior art.
Figure 6:
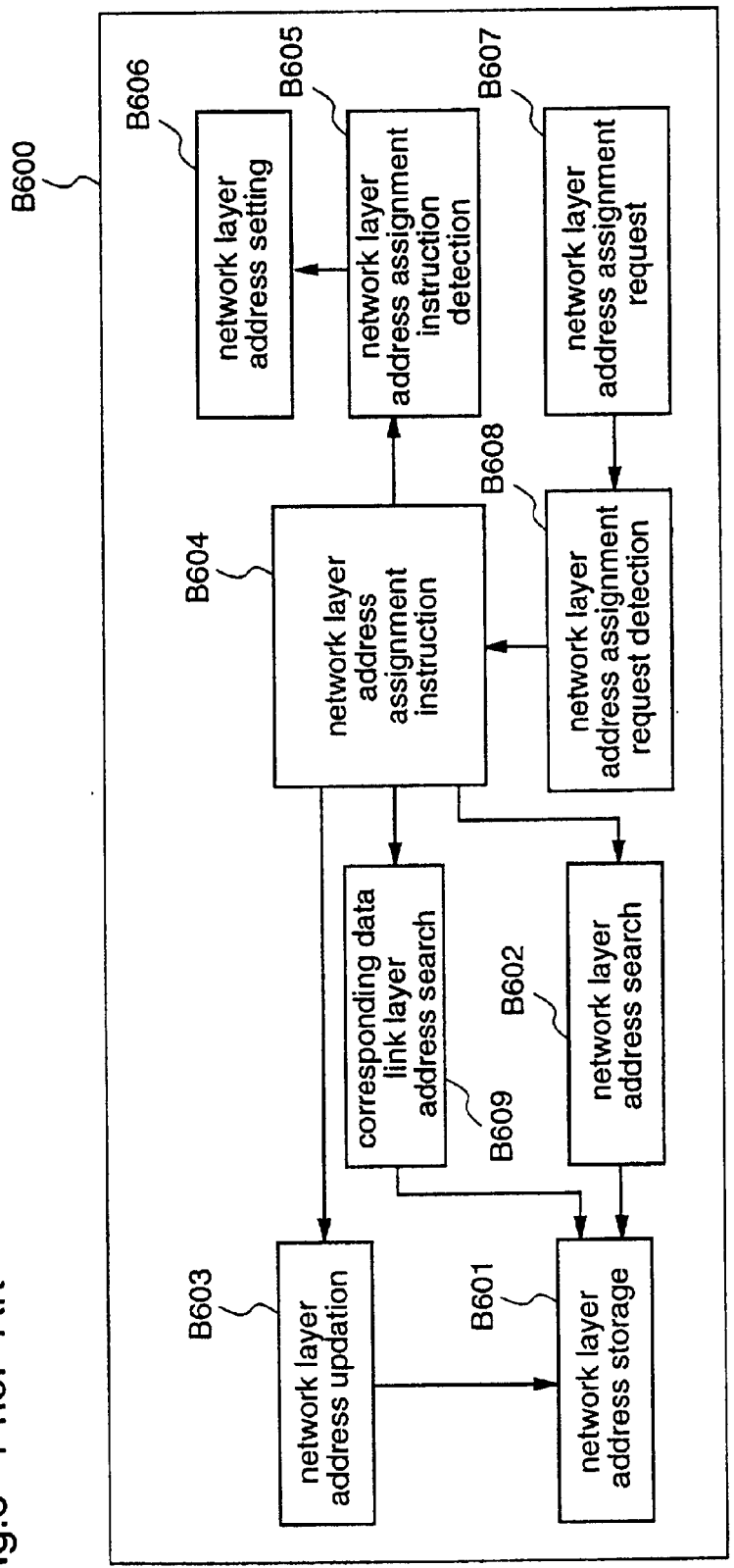
FIG. 6 is a block diagram illustrating a network layer address management apparatus according to the prior art.

FIG. 4 is a block diagram illustrating the construction of an address management apparatus B400 according to the fourth embodiment.

This address management apparatus B400 includes an address detection means (unit) B401 for detecting a message on the connected network, extracting the correspondence between the data link layer addresses and the network layer addresses of the source and destination of the message, updating the data link layer address table D1006 possessed by the data link layer address storage means B101 by using the data link layer address updation means B103, and updating the network layer address table D1503 possessed by the network layer address storage means B601 by using the network layer address updation means B603.

Figure 19:
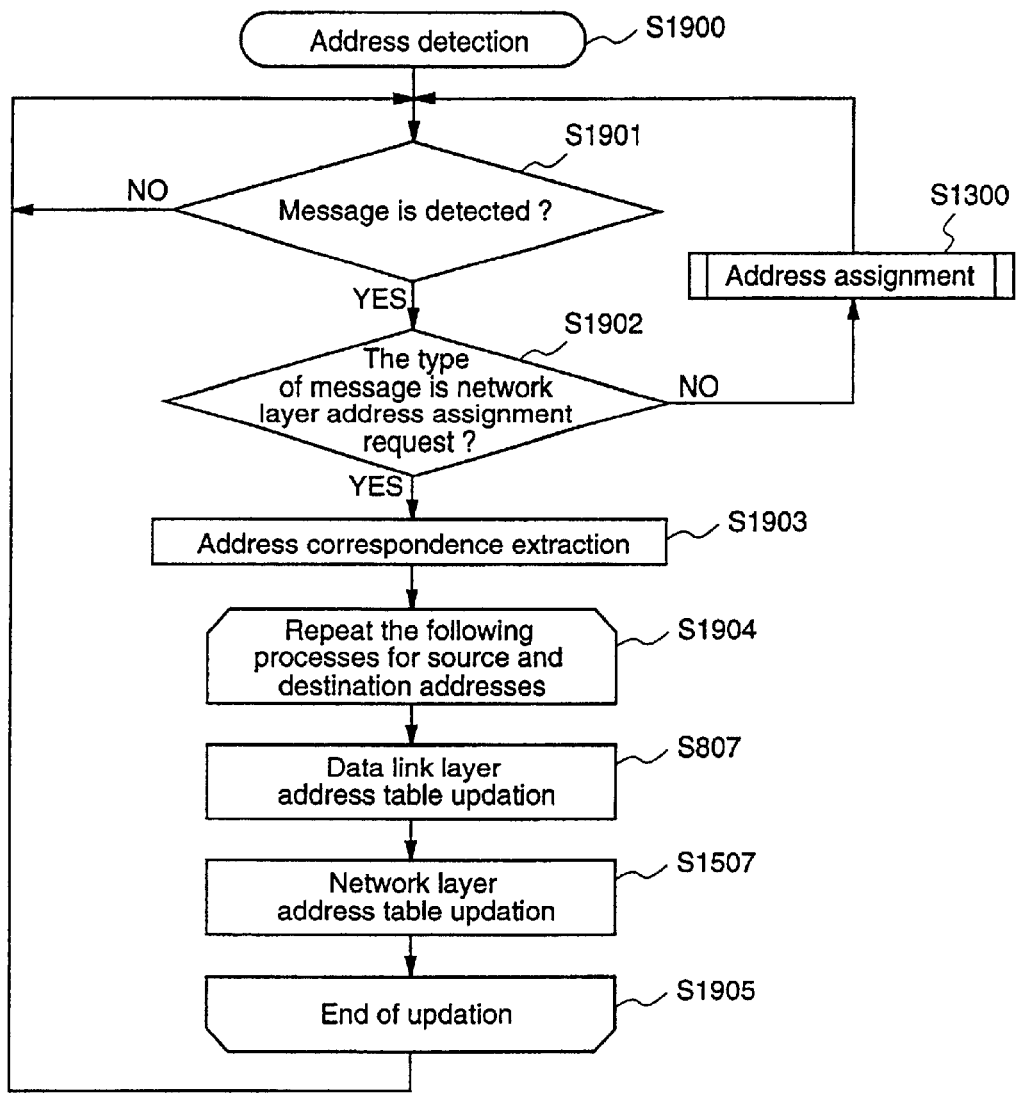
FIG. 19 is a flowchart for explaining an address management method according to the fourth embodiment.
Figure 21:
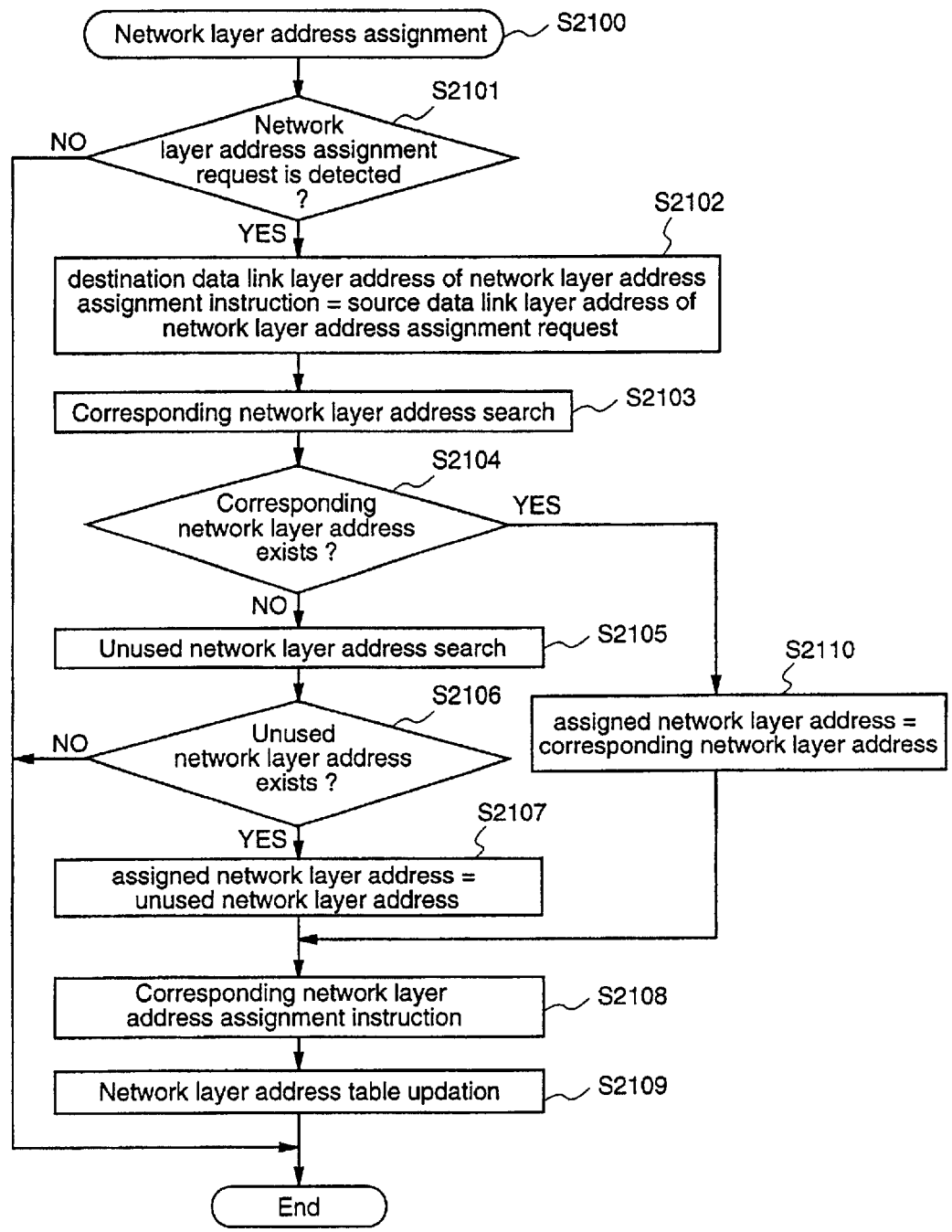
FIG. 21 is a flowchart for explaining an address management method according to the second prior art.

FIG. 19 is a flowchart for explaining, in detail, the operation of the address management apparatus B400 of this fourth embodiment relating to the network layer address assignment request delay process.

When the address detection means B401 does not detect a message on the network, the process returns step S1901. When the address detection means B401 detects a message on the network, the process goes to step S1902.

When the detected message is a network layer address assignment request D1500, the process goes to the network layer address assignment request step S1700 shown in FIG. 17. When the detected message is other than the network layer address assignment request D1500, the process goes to step S1903.

In step S1903, the data link layer addresses and the network layer addresses of the source and destination of the message are extracted from the dectected message.

With respect to the data link layer addresses and the network layer addresses of the source and destination, steps S807 and S1507 are repeated (S1904). Since steps S807 and S1507 are identical to those already described for the first and second embodiments, repeated description is not necessary.

After step S1904 is ended (S1905), the address detection process is repeated.

Hereinafter, the processing according to this fourth embodiment will be described with reference to FIGS. 4 and 20.

Initially, the state of the address management apparatus before performing the process which will be described later is shown in FIG. 20.

To be specific, FIG. 20(*a*1) shows the address state of the server before the process described below, FIG. 20(*b*1) shows the address state of the client 1, FIG. 20(*c*1) shows the address state of the client 2, FIG. 20(*d*1) shows the state of the data link layer address table of the server, and FIG. 20(*e*1) shows the state of the network layer address table of the server.

A description is now given of the operation of the address management apparatus B400 of this fourth embodiment in the case where the client 1 and the client 2 conduct communications with the server.

When the client 1 conducts a communication with the server, both of the data link layer address and the network layer address of the client 1 are entered into the data link layer address table and the network layer address table, respectively.

FIG. 20 shows the state of the address management apparatus B400 at this point of time.

To be specific, FIG. 20(*a*2) shows the address state of the server at this point of time, FIG. 20(*b*2) shows the address state of the client 1, FIG. 20(*c*2) shows the address state of the client 2, FIG. 20(*d*2) shows the state of the data link layer address table of the server, and FIG. 20(*e*2) shows the state of the network layer address table of the server.

When the client 2 conducts a communication with the server, the correspondence between the data link layer address DA2 and the network layer address NA3 is detected, and the correspondence between the data link layer address DA2 and the network layer address NA2 and the correspondence between the data link layer address DA3 and the network layer address NA3, which are respectively stored in the data link layer address table D1006 and the network layer address table D1503, are deleted, and then the correspondence between the data link layer address DA2 and the network layer address NA3 is entered.

FIG. 20 further shows the state of the address management apparatus B400 after the processing described above.

To be specific, FIG. 20(*a*3) shows the address state of the server after the processing described above, FIG. 20(*b*3) shows the address state of the client 1, FIG. 20(*c*3) shows the address state of the client 2, FIG. 20(*d*3) shows the state of the data link layer address table of the server, and FIG. 20(*e*3) shows the state of the network layer address table of the server.

Since the address management apparatus B400 according to the fourth embodiment operates as described above, even when an address is set or changed outside the address management apparatus B400, assignment of a network layer address is achieved without assigning the same data link layer address or network layer address to different apparatuses. Further, although this fourth embodiment relates to an address management apparatus, the present invention is not restricted to the construction of the address management apparatus of the fourth embodiment, and it is also possible to construct a method for implementing the above-described operation.

What is claimed is:

1. An address management apparatus for managing a network layer address and a data link layer address of a terminal connected to a network, said apparatus comprising:

data link layer address storage means for storing a data link layer address table showing the correspondence between data link layer addresses and network layer addresses;

data link layer address search means for searching the data link layer address table so as to detect an unused data link layer address;

corresponding network layer address search means for searching the data link layer address table so as to detect a network layer address corresponding to a specified data link layer address;

data link layer address assignment instruction means for transmitting a data link layer address assignment instruction which includes, as information, at least the unused data link layer address detected by the data link layer address search means to a terminal specified by the network layer address detected by the corresponding network layer address search means;

data link layer address updation means for updating the correspondence between the data link layer address and the network layer address on the data link layer address table according to the information of the data link layer address assignment instruction;

data link layer address assignment instruction detection means for detecting the data link layer address assignment instruction so as to obtain the data link layer address from the data link layer address assignment instruction in the terminal specified by the network layer address detected by the corresponding network layer address search means; and data link layer address setting means for setting the data link layer address obtained by the data link layer address assignment instruction detection means in the terminal specified by the network layer address.

2. The address management apparatus of claim 1, further comprising:

network layer address storage means for storing a network layer address table showing the correspondence between network layer addresses and data link layer addresses;

network layer address search means for searching the network layer address table for an unused network layer address;

corresponding data link layer address search means for searching the network layer address table so as to detect a network layer address corresponding to a specified data link layer address;

network layer address assignment request detection means for detecting a network layer address assignment request including at least data link layer address information, wherein the network layer address assignment request is output from a terminal that needs to set a network layer address;

address assignment instruction means for transmitting a network layer address assignment instruction including, as information, the unused network layer address detected by the network layer address search means to the terminal which needs to set a network layer address when there is no network layer address detected by the corresponding data link layer address search means;

network layer address updation means for updating the correspondence between the network layer address and the data link layer address on the network layer address table according to the network layer address assignment instruction or the data link layer address assignment instruction;

network layer address assignment request means for transmitting the network layer address assignment request in the terminal which needs to set a network layer address;

network layer address assignment instruction detection means for detecting the network layer address assignment instruction, and extracting the network layer address from the network layer address assignment instruction; and network layer address setting means for setting the network layer address extracted by the network layer address assignment instruction detection means in the terminal which needs to set a network layer address;

wherein said data link layer address updation means updates the correspondence between the data link layer address and the network layer address on the data link layer address table according to the network layer address assignment instruction or the data link layer address assignment instruction;

wherein said corresponding network layer address search means searches the data link layer address table for a network layer address corresponding to the data link layer address in the network layer address assignment request information; and wherein, when the network layer address searched by the corresponding network layer address search means exists in the data link layer address table, said data link layer address assignment instruction means transmits a data link layer address assignment instruction including, as information, at least the unused data link layer address detected by the data link layer address search means to the terminal having the network layer address.

3. The address management apparatus of claim 2, further comprising:

network layer address assignment request delay means for detecting, in the terminal specified by the data link layer address, a network layer address assignment request directed to another terminal, extracting a source data link layer address in the information of the detected network layer address assignment request, and delaying transmission of a network layer address assignment request from the terminal specified by the data link layer address when the extracted data link layer address is equal to the data link layer address of the terminal specified by the data link layer address.

4. The address management apparatus of claim 1, further comprising:

address detection means for detecting the correspondence between a data link layer address and a network layer address of a source of a transmission packet on the connected network, and the correspondence between a data link layer address and a network layer address of a destination of the transmission packet;

wherein said data link layer address updation means updates the correspondence between the data link layer address and the network layer address on the data link layer address table according to the correspondence between the data link layer address and the network layer address of the source, and the correspondence between the data link layer address and the network layer address of the destination, which are detected by the address detection means; and said network layer address table updation means updates the correspondence between the data link layer address and the network layer address on the network layer address table according to the correspondence between the data link layer address and the network layer address of the source, and the correspondence between the data link layer address and the network layer address of the destination, which are detected by the address detection means.

5. The address management apparatus of claim 2, further comprising:

address detection means for detecting the correspondence between a data link layer address and a network layer address of a source of a transmission packet on the connected network, and the correspondence between a data link layer address and a network layer address of a destination of the transmission packet;

wherein said data link layer address updation means updates the correspondence between the data link layer address and the network layer address on the data link layer address table according to the correspondence between the data link layer address and the network layer address of the source, and the correspondence between the data link layer address and the network layer address of the destination, which are detected by the address detection means; and said network layer address table updation means updates the correspondence between the data link layer address and the network layer address on the network layer address table according to the correspondence between the data link layer address and the network layer address of the source, and the correspondence between the data link layer address and the network layer address of the destination, which are detected by the address detection means.

6. An address management method for managing a network layer address and a data link layer address of a terminal connected to a network, said comprising:

a data link layer address storage operation of storing a data link layer address table showing the correspondence between data link layer addresses and network layer addresses;

a data link layer address search operation of searching the data link layer address table so as to detect an unused data link layer address;

a corresponding network layer address search operation of searching the data link layer address table so as to detect a network layer address corresponding to a specified data link layer address;

a data link layer address assignment instruction operation of transmitting a data link layer address assignment instruction which includes, as information, at least the unused data link layer address detected in the data link layer address search operation to a terminal specified by the network layer address detected in the corresponding network layer address search operation;

a data link layer address updation operation of updating the correspondence between the data link layer address and the network layer address on the data link layer address table according to the information of the data link layer address assignment instruction;

a data link layer address assignment instruction detection operation of detecting the data link layer address assignment instruction so as to obtain the data link layer address from the data link layer address assignment instruction, in the terminal specified by the network layer address detected in the corresponding network layer address search operation; and a data link layer address setting operation of setting the data link layer address obtained in the data link layer address assignment instruction detection operation in the terminal specified by the network layer address.

7. The address management method of claim 6, further comprising:

a network layer address storage operation of storing a network layer address table showing the correspondence between network layer addresses and data link layer addresses;

a network layer address search operation of searching the network layer address table so as to detect an unused network layer address;

a corresponding data link layer address search operation of searching the network layer address table so as to detect a network layer address corresponding to a specified data link layer address;

a network layer address assignment request detection operation of detecting a network layer address assignment request including at least data link layer address information, wherein the network layer address assignment request is transmitted by a terminal that needs to set a network layer address;

an address assignment instruction operation of transmitting a network layer address assignment instruction including, as information, the unused network layer address detected in the network layer address search operation to the terminal which needs to set a network layer address when no network layer address is detected in the corresponding data link layer address search operation;

a network layer address updation operation of updating the correspondence between the network layer address and the data link layer address on the network layer address table according to the network layer address assignment instruction or the data link layer address assignment instruction;

a network layer address assignment request operation of transmitting the network layer address assignment request in the terminal which needs to set a network layer address;

a network layer address assignment instruction detection operation of detecting the network layer address assignment instruction, and extracting the network layer address from the network layer address assignment instruction; and a network layer address setting operation of setting the network layer address extracted in the network layer address assignment instruction detection operation in the terminal which needs to set a network layer address;

wherein said data link layer address updation operation updates the correspondence between the data link layer address and the network layer address on the data link layer address table according to the network layer address assignment instruction or the data link layer address assignment instruction;

wherein, in said corresponding network layer address search operation, the data link layer address table is searched for a network layer address corresponding to the data link layer address in the network layer address assignment request information; and wherein when the network layer address searched for in said corresponding network layer address search operation exists in the data link layer address table, in said data link layer address assignment instruction operation, a data link layer address assignment instruction including, as information, at least the unused data link layer detected in the data link layer address search operation is transmitted to the terminal having the network layer address.

8. The address management method of claim 7, further comprising:

a network layer address assignment request delay operation of detecting, in the terminal specified by the data link layer address, a network layer address assignment request directed to another terminal, extracting a source data link layer address in the information of the detected network layer address assignment request, and delaying transmission of a network layer address assignment request from the terminal specified by the data link layer address when the extracted data link layer address is equal to the data link layer address of the terminal specified by the data link layer address.

9. The address management method of claim 6, further comprising:

an address detection operation of detecting the correspondence between a data link layer address and a network layer address of a source of a transmission packet on the connected network, and the correspondence between a data link layer address and a network layer address of a destination of the transmission packet;

wherein, in said data link layer address updation operation, the correspondence between the data link layer address and the network layer address on the data link layer address table is updated according to the correspondence between the data link layer address and the network layer address of the source, and the correspondence between the data link layer address and the network layer address of the destination, which are detected in the address detection operation; and in said network layer address table updation operation, the correspondence between the data link layer address and the network layer address on the network layer address table is updated according to the correspondence between the data link layer address and the network layer address of the source, and the correspondence between the data link layer address and the network layer address of the destination, which are detected in the address detection operation.

10. The address management method of claim 7, further comprising:

an address detection operation of detecting the correspondence between a data link layer address and a network layer address of a source of a transmission packet on the connected network, and the correspondence between a data link layer address and a network layer address of a destination of the transmission packet;

wherein, in said data link layer address updation operation, the correspondence between the data link layer address and the network layer address on the data link layer address table is updated according to the correspondence between the data link layer address and the network layer address of the source, and the correspondence between the data link layer address and the network layer address of the destination, which are detected in the address detection operation; and in said network layer address table updation operation, the correspondence between the data link layer address and the network layer address on the network layer address table is updated according to the correspondence between the data link layer address and the network layer address of the source, and the correspondence between the data link layer address and the network layer address of the destination, which are detected in the address detection operation.

11. An address management apparatus for managing a network layer address and a data link layer address of a terminal connected to a network, said apparatus comprising:

a data link layer address storage unit for storing a data link layer address table showing the correspondence between data link layer addresses and network layer addresses;

a data link layer address search unit operable for searching the data link layer address table so as to detect an unused data link layer address;

a corresponding network layer address search unit for searching the data link layer address table so as to detect a network layer address corresponding to a specified data link layer address;

a data link layer address assignment instruction unit for transmitting a data link layer address assignment instruction which includes, as information, at least the unused data link layer address detected by said data link layer address search unit to a terminal specified by the network layer address detected by said corresponding network layer address search unit;

a data link layer address updating unit for updating the correspondence between the data link layer address and the network layer address on the data link layer address table according to the information of the data link layer address assignment instruction;

a data link layer address assignment instruction detection unit for detecting the data link layer address assignment instruction so as to obtain the data link layer address from the data link layer address assignment instruction in the terminal specified by the network layer address detected by said corresponding network layer address search unit; and a data link layer address setting unit for setting the data link layer address obtained by said data link layer address assignment instruction detection unit in the terminal specified by the network layer address.

12. The address management apparatus of claim 11, further comprising:

a network layer address storage unit for storing a network layer address table showing the correspondence between network layer addresses and data link layer addresses;

a network layer address search unit for searching the network layer address table for an unused network layer address;

a corresponding data link layer address search unit for searching the network layer address table so as to detect a network layer address corresponding to a specified data link layer address;

a network layer address assignment request detection unit for detecting a network layer address assignment request including at least data link layer address information, wherein the network layer address assignment request is output from a terminal that needs to set a network layer address;

an address assignment instruction unit for transmitting a network layer address assignment instruction including, as information, the unused network layer address detected by said network layer address search unit to the terminal which needs to set a network layer address when said corresponding data link layer address search unit does not detect a network layer address;

a network layer address updating unit for updating the correspondence between the network layer address and the data link layer address on the network layer address table according to the network layer address assignment instruction or the data link layer address assignment instruction;

a network layer address assignment request unit for transmitting the network layer address assignment request in the terminal which needs to set a network layer address;

a network layer address assignment instruction detection unit for detecting the network layer address assignment instruction, and for extracting the network layer address from the network layer address assignment instruction; and a network layer address setting unit for setting the network layer address extracted by said network layer address assignment instruction detection unit in the terminal which needs to set a network layer address;

wherein said data link layer address updating unit updates the correspondence between the data link layer address and the network layer address on the data link layer address table according to the network layer address assignment instruction or the data link layer address assignment instruction;

wherein said corresponding network layer address search unit searches the data link layer address table for a network layer address corresponding to the data link layer address in the network layer address assignment request information; and wherein said data link layer address assignment instruction unit transmits a data link layer address assignment instruction including, as information, at least the unused data link layer address detected by said data link layer address search unit to the terminal having the network layer address when the network layer address searched by said corresponding network layer address search unit exists in the data link layer address table.

13. The address management apparatus of claim 12, further comprising a network layer address assignment request delay unit for:

detecting, in the terminal specified by the data link layer address, a network layer address assignment request directed to another terminal;

extracting a source data link layer address in the information of the detected network layer address assignment request; and delaying transmission of a network layer address assignment request from the terminal specified by the data link layer address when the extracted data link layer address is equal to the data link layer address of the terminal specified by the data link layer address.

14. The address management apparatus of claim 11, further comprising:

an address detection unit for detecting the correspondence between a data link layer address and a network layer address of a source of a transmission packet on the connected network, and the correspondence between a data link layer address and a network layer address of a destination of the transmission packet;

wherein said data link layer address updating unit updates the correspondence between the data link layer address and the network layer address on the data link layer address table according to the correspondence between the data link layer address and the network layer address of the source, and the correspondence between the data link layer address and the network layer address of the destination, which are detected by said address detection unit; and said network layer address table updating unit updates the correspondence between the data link layer address and the network layer address on the network layer address table according to the correspondence between the data link layer address and the network layer address of the source, and the correspondence between the data link layer address and the network layer address of the destination, which are detected by said address detection unit.

15. The address management apparatus of claim 12, further comprising:

an address detection unit for detecting the correspondence between a data link layer address and a network layer address of a source of a transmission packet on the connected network, and the correspondence between a data link layer address and a network layer address of a destination of the transmission packet;

wherein said data link layer address updating unit updates the correspondence between the data link layer address and the network layer address on the data link layer address table according to the correspondence between the data link layer address and the network layer address of the source, and the correspondence between the data link layer address and the network layer address of the destination, which are detected by said address detection unit; and said network layer address table updating unit updates the correspondence between the data link layer address and the network layer address on the network layer address table according to the correspondence between the data link layer address and the network layer address of the source, and the correspondence between the data link layer address and the network layer address of the destination, which are detected by said address detection unit.

* * * * *

UNITED STATES PATENT AND TRADEMARK OFFICE
CERTIFICATE OF CORRECTION

PATENT NO. : 7,050,433 B2  Page 1 of 1
APPLICATION NO. : 09/754142
DATED : May 23, 2006
INVENTOR(S) : Satoshi Ando et al.

It is certified that error appears in the above-identified patent and that said Letters Patent is hereby corrected as shown below:

IN THE CLAIMS

Claim 6
Column 23, line 45, please add --method-- after "said" and before "comprising".

Claim 7
Column 25, line 6, please add --,-- after "wherein" and before "when".

Signed and Sealed this

Fifth Day of December, 2006

JON W. DUDAS
*Director of the United States Patent and Trademark Office*